United States Patent
Kutsumi et al.

(10) Patent No.: US 7,840,565 B2
(45) Date of Patent: Nov. 23, 2010

(54) DICTIONARY CREATION DEVICE AND DICTIONARY CREATION METHOD

(75) Inventors: Hiroshi Kutsumi, Osaka (JP); Eiichi Naito, Kyoto (JP); Jun Ozawa, Nara (JP); Hideyuki Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 566 days.

(21) Appl. No.: 11/471,538

(22) Filed: Jun. 21, 2006

(65) Prior Publication Data

US 2006/0242191 A1  Oct. 26, 2006

Related U.S. Application Data

(63) Continuation of application No. PCT/JP2004/017578, filed on Nov. 26, 2004.

(30) Foreign Application Priority Data

Dec. 26, 2003 (JP) .............................. 2003-433872

(51) Int. Cl.
*G06F 17/30* (2006.01)
(52) U.S. Cl. ................... 707/740; 707/728; 707/730; 707/748
(58) Field of Classification Search ............... None
See application file for complete search history.

(56) References Cited

U.S. PATENT DOCUMENTS

| 6,546,401 | B1 | 4/2003 | Iizuka et al. |
| 2002/0157096 | A1 | 10/2002 | Hane et al. |
| 2003/0061570 | A1* | 3/2003 | Hatori et al. ................ 715/530 |
| 2003/0093790 | A1 | 5/2003 | Logan et al. |

(Continued)

FOREIGN PATENT DOCUMENTS

JP  6-282587  10/1994

(Continued)

OTHER PUBLICATIONS

Office Action issued Feb. 24, 2009 in U.S. Appl. No. 11/497,357.

(Continued)

*Primary Examiner*—Neveen Abel Jalil
*Assistant Examiner*—Farhan M Syed
(74) *Attorney, Agent, or Firm*—Wenderoth, Lind & Ponack, L.L.P.

(57) ABSTRACT

A dictionary creation device and dictionary creation method are provided which optimally create and update a dictionary for classifying, searching, or extracting text information in accordance with a changes in content of text information groups. The dictionary creation device includes a keyword extraction unit that extracts a keyword from inputted text information and a keyword statistics unit that finds statistics regarding an appearance of the keyword. The dictionary creation device further includes a keyword assessment value calculation unit that calculates an assessment value of the extracted keyword based on the statistics regarding the appearance of the keyword, a determination unit that determines whether or not to register or delete the keyword based on the calculated assessment value, a dictionary registration and deletion unit which registers or deletes the keyword in or from a dictionary database based on a result of the determination performed by the determination unit, and the dictionary database.

13 Claims, 35 Drawing Sheets

U.S. PATENT DOCUMENTS

| | | |
|---|---|---|
| 2003/0135513 A1 | 7/2003 | Quinn et al. |
| 2003/0172063 A1* | 9/2003 | Gutta et al. ............... 707/5 |
| 2003/0195863 A1* | 10/2003 | Marsh ..................... 707/1 |
| 2004/0205671 A1 | 10/2004 | Sukehiro et al. |
| 2005/0010582 A1* | 1/2005 | Saito et al. ............. 707/100 |
| 2005/0165739 A1 | 7/2005 | Yamamoto et al. |
| 2006/0100876 A1* | 5/2006 | Nishizaki et al. ......... 704/257 |

FOREIGN PATENT DOCUMENTS

| | | |
|---|---|---|
| JP | 9-153043 | 6/1997 |
| JP | 10-074208 | 3/1998 |
| JP | 11-272706 | 10/1999 |
| JP | 2000-293540 | 10/2000 |
| JP | 2000-324246 | 11/2000 |
| JP | 2001-014330 | 1/2001 |
| JP | 2001-034623 | 2/2001 |
| JP | 2002-015001 | 1/2002 |
| JP | 2002-320159 | 10/2002 |
| JP | 2003-134412 | 5/2003 |
| JP | 2003-288359 | 10/2003 |
| WO | 03/081472 | 10/2003 |

OTHER PUBLICATIONS

Y. Wu et al., "Bunsho Jido Bunrui no Tame no Bun' ya Kanrengo Jisho no Kosei", (Building Thesauri for Automatic Document Classification), Information Processing Society of Japan Kenkyu Hokoku, vol. 2000, No. 29, Mar. 2000, pp. 33-39, with translation.

T. Iwadera, "Trend—Tracking-gata Test Jido Bunrui no Kokorumi", (Automatic Text Classification Using Trend Tracking), Information Processing Society of Japan Kenkyu Hokoku, vol. 97, No. 53, May 1997, pp. 19-24, with translation.

H. Seno, "Moji Joho o Shutai to shita Data Hoso Service ni okeru Indexing no Kento", (Indexing in a Text Oriented Data Broadcasting Service), The Journal of Information Science and Technology Association, vol. 42, No. 11, Nov. 1992, pp. 1023-1032, with translation.

Office Action issued Dec. 17, 2009 in U.S. Appl. No. 11/497,357.

Ichise, Ryutaro et al., "Integrating Multiple Internet Directories by Instance-based Learning," Aug. 11, 2003, Proceedings of the 18th International Joint Conference on Artificial Intelligence, pp. 22-28.

* cited by examiner

| Keyword | Number of Appearing Texts |
|---|---|
| Actor | 85 |
| World | 30 |
| Parliament | 4 |
| ⋮ | ⋮ |

| Keyword | Assessment Value |
|---|---|
| Actor | 1.07 |
| World | 1.52 |
| Parliament | 2.40 |
| ⋮ | ⋮ |

FIG. 17

| Classification | Constant Characteristic Keyword |
|---|---|
| Movies | movie, Hollywood movie, Japanese movie, actor, premier, road show, director ... |
| Music | music, tunes, song, CD, charts ... |
| ... | ... |

Classification Example for
Internet Directory Service

Classification Example
for E-Newspaper

FIG. 19
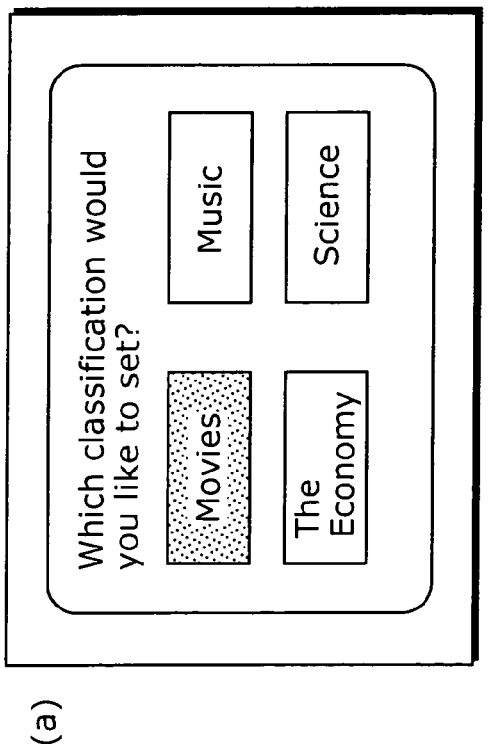
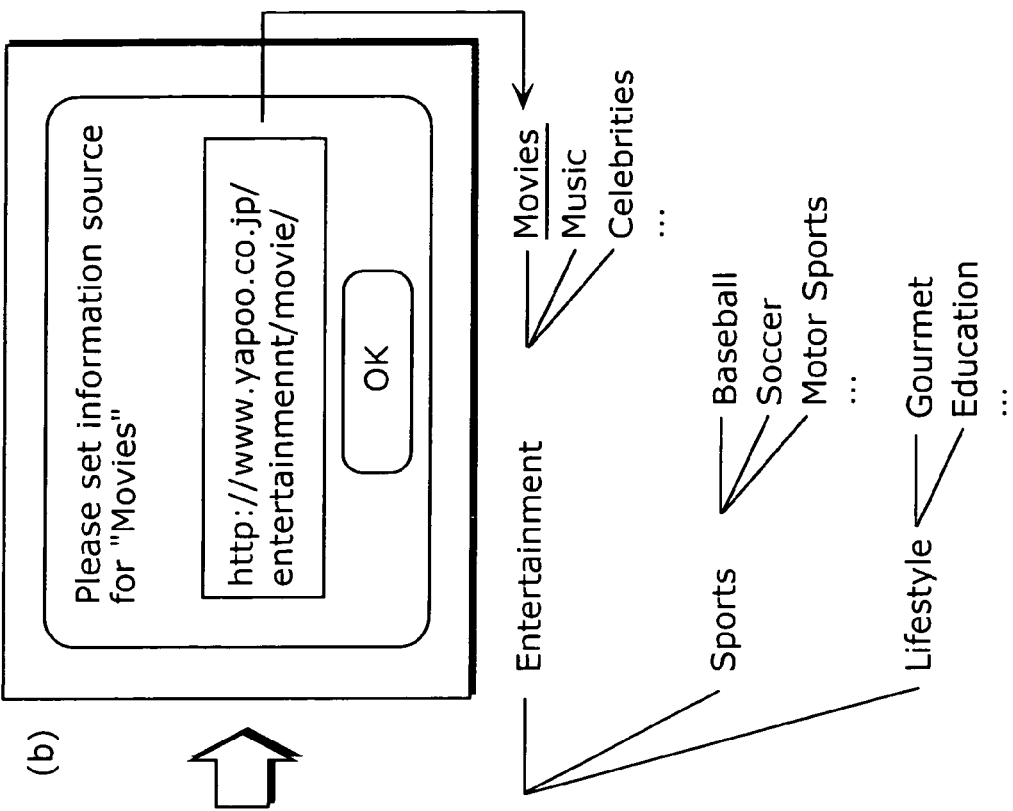

FIG. 20A

Movie Information

| Metrix: Unloaded |
| --- |
| Starring Kianu Reeves, Florence Fishburne, others |
| Directed by Randy Wachowski |
| In this long-awaited sequel to the smash hit "Metrix," the AI-based machine army which created the Metrix (a virtual world) discovers the city of Taion, mankind's final stronghold, and unleashes a brutal attack. Nio, the savior of the human race, has grown into an emotionally mature leader fully aware of the extent of his own power.  Facing off with the enemy, flying like Duperman - will Nio be able to rescue his friends? |

FIG. 20B

Music Information

| This Week's Hot CD |
| --- |
| The Beetles Album |
| Let Me Be ... Faked |
| On Sale 11/14/2003 |
| Nishishiba EMI TOCP-67300 |
| ■ Songs |
| 1. Get Jack |
| 2. Dig a Horsie |
| ... |

FIG. 21

| Classification | Characteristic Keywords |
| --- | --- |
| Movies | Metrix, Unloaded, Kianu Reeves, Florence Fishburne, Randy, Wachowski, sequel, AI, machine army, Taion, savior, Nio, Duperman |
| Music | CD, Beetles, Let Me Be  Faked, Songs, Get Jack, Dig a Horsie |
| ... | ... |

FIG. 22

| Classification | Constant Characteristic Keywords | Topical Characteristic Keywords |
|---|---|---|
| Movies | movie, Hollywood movie, Japanese movie, actor, premier, road show, director ... | Metrix, Unloaded, Kianu Reeves, Florence Fishburne, Randy, Wachowski, sequel, AI, machine army, Taion, savior, Nio, Duperman |
| Music | music, tunes, song, CD, charts ... | CD, Beetles, Let Me Be ... Faked, songs, Get Jack, Dig a Horsie ... |
| ... | ... | ... |

FIG. 24

7:00~7:55
6 Maiasa Broadcast
Atsushi's Trend Info
▽Special guest: Kianu, from the smash hit "Metrix"▽Latest from the World Cup Classifications in Yapoo Site Classifications in Maiasa E-Newspaper Classifications in GHO Site FIG. 30A  Classifications in Directory A

| Classification | Characteristic Keywords |
|---|---|
| Sports | baseball, pro, Blue Sox, Hankees, America League, Nation League, tennis, World Cup, Wimbledon, Olympics, rally, motor sports, sumo ... |
| The Economy | stock market, finances, bank, interest, low yen rate, high yen rate, dollar ... |
| ... | ... |

FIG. 30B  Classifications in Directory B

| Classification | Characteristic Keywords |
|---|---|
| Baseball | baseball, pro, Blue Sox, Hankees, America League, Nation League, home run, Japan Series, big leagues, trade ... |
| Tennis | tennis, American Open, Australian Open, Booker, Wiliams, World Cup, Wimbledon, Olympics ... |
| ... | ... |

FIG. 30C  Classifications in Directory C

| Classification | Characteristic Keywords |
|---|---|
| Business | electronics, United States, dollar depreciation, tax, insurance, finances, bank, low yen rate, high yen rate, pension ... |
| The Arts | painting, music, movies, CD, DVD, greatest hits, classical ... |
| ... | ... |

FIG. 34

| Classification | Constant Characteristic Keywords | Time Period | Topical Characteristic Keywords |
|---|---|---|---|
| Movies | movie, Hollywood movie, Japanese movie, actor, premier, road show, director ... | November 2003 | Metrix, Unloaded, Kianu Reeves, Florence Fishburne, Randy, Wachowski, sequel, AI, machine army, Taion, savior, Nio, Duperman |
| | | October 2003 | Exterminator, Harold Swarzenegger, Flaire Danes, Jonathan Moscow, Jane Conner, Sarah, female type, T-X, T-850 |
| | | September 2003 | ... |

DICTIONARY CREATION DEVICE AND DICTIONARY CREATION METHOD

CROSS REFERENCE TO RELATED APPLICATION

This is a continuation of PCT application No. PCT/JP2004/017578, filed Nov. 26, 2004 and designating the United States of America.

BACKGROUND OF THE INVENTION (1) Field of the Invention

The present invention relates to a dictionary creation device which creates and updates a dictionary used for searching, classifying, or filtering information written as text.

(2) Description of the Related Art

In recent years, hard disks, Digital Versatile Discs (DVDs), and the like have become widespread due to price reduction, and therefore it has become possible to easily accumulate moving picture information such as TV programs. Furthermore, due to the increased capacity of these hard disks and DVDs, it is possible to accumulate large quantities of moving picture content.

On the other hand, with an electronic program guide of a TV program and the like, it is possible to acquire, as text information, information regarding each TV program. Accordingly, it has become possible to accumulate TV programs in accordance with the tastes of a viewer and classify the accumulated TV programs using the text information. In order to use the text information of the TV program for selection of the TV program and classification of the accumulated TV programs, it is necessary to judge, based on TV program guide information, which keyword expresses characteristics of the TV program. Accordingly, in order to extract an important keyword from the text information of the TV program and exclude unnecessary keywords beforehand, an approach is taken in which a dictionary is built in advance.

As such a dictionary, dictionaries such as the following exist: an extraction dictionary, in which the keywords used for classification, searching, and extraction of the text information are written; an unnecessary word dictionary, which collects unnecessary keywords in order to exclude keywords that are of no use in classifying, searching, or extracting the text information; and so on.

In order to create an extraction dictionary, keywords that actually appear are picked up from sample data of a mass of text information groups that are to be classified, searched, and so on. Furthermore, only keywords that are characteristic in the classification and searching of the target text information groups are employed as the extraction dictionary. For example, assuming an Electric Program Guide (EPG) as the target text information, in the case where names of actors and general nouns are considered to be useful in classification and searching, the names of actors and the general nouns appearing in the actual EPG data are extracted, and the extraction dictionary is created from these names and nouns.

In the same manner, when creating an unnecessary word dictionary, keywords that are useless in, or, more importantly, keywords that interfere with classification and searching, are extracted from among the keywords that appear in the sample data of the target text information group, and those keywords are employed as the unnecessary word dictionary. For example, in the case where a keyword that appears in most of the EPG data is present, that keyword cannot characterize individual EPG data, and thus can be considered an unnecessary keyword.

As the abovementioned type of approach, a TV program recommendation system has been provided, which sets, in advance, a dictionary regarding a plurality of themes, and uses that theme dictionary to classify and search TV programs (for example, see Patent Reference 1: Japanese Laid-Open Patent Application No. 2002-320159). With such a TV program recommendation system, when the theme is, for example, "travel," it is possible to search/classify TV programs about "travel" by using a dictionary which has set such characteristic keywords as "inn," "lodgings," "wheel window," "cruise," and so on. Furthermore, by using operation information from a user to build a profile in accordance with that user's tastes, providing TV programs catering to that user can be realized.

In addition, a digital broadcast reception device is provided which makes the TV program display easier for the user to understand by changing the color of a TV program in a TV program chart depending on a theme (genre) set in advance (for example, see Patent Reference 2: Japanese Laid-Open Patent Application No. 2003-134412).

SUMMARY OF THE INVENTION

However, with the conventional dictionary creation method, both the extraction dictionary and the unnecessary word dictionary are fixed dictionaries created from the sample data of a target text information group, and therefore cannot reflect changes in the target text information group.

For example, in politics, there are cases where the name and so on of a prime minister differs depending on the era, as well as with professional baseball players, where a player's team may differ depending on the era, due to trades, and so on. In addition, in an EPG, actors' names also change along with the era, and there are situations in which an actor who frequently appeared when the dictionary was created no longer appears a few years later, or, conversely, an actor unknown when the dictionary was created becomes a big hit later on. Furthermore, when a major event (such as the Olympics) or a major accident occurs, related TV programs increase sharply, and thus it can be assumed that the trend of appearing keywords can change significantly. In addition, the possibility of seeing a major fluctuation in the written details of the EPG in the future, due to the appearance of a new form of broadcast, a change in broadcasting culture, and so on, can be considered.

Also, with regards to "travel" as mentioned in the above Patent Reference 1, trends vary depending on the era, and there are many cases in which updating the dictionary in accordance with each era is necessary.

Therefore, there is a problem in that a dictionary used for classifying, searching, or extracting text must be re-created in an appropriate form in accordance with changes in the details of such text information groups.

Accordingly, an object of the present invention is to provide a dictionary creation device and dictionary creation method which optimally creates and updates a dictionary for classifying, searching, or extracting text information in accordance with a change in details of text information groups.

To achieve the abovementioned object, the dictionary creation device according to the present invention creates a dictionary used for searching, classifying, or filtering information written as text, and includes: a keyword extraction unit which extracts a keyword from a text information group made up of one or more pieces of text information; a keyword statistics unit which finds statistics regarding an appearance of the keyword within the text information group; a keyword assessment value calculation unit which calculates an assessment value for the keyword based on the statistics; a keyword storage unit which stores a pair made up of the keyword and the assessment value of that keyword; a determination unit which determines whether or not to register the keyword in the dictionary, or whether or not to delete the keyword from the dictionary, based on a degree of change between the assessment value newly calculated by the keyword assessment value calculation unit and the assessment value stored in the keyword storage unit; and a dictionary registration and deletion unit which registers or deletes the keyword in the dictionary based on a result of the determination.

In addition, the dictionary creation device according to the present invention creates a dictionary used for searching, classifying, or filtering information written as text, and includes: a keyword extraction unit which extracts a keyword from a text information group made up of one or more pieces of text information; a keyword statistics unit which finds statistics regarding an appearance of the keyword within the text information group; a keyword assessment value calculation unit which calculates an assessment value for the keyword based on the statistics; a keyword storage unit which stores a pair made up of the keyword and the assessment value of that keyword; a determination unit which determines whether or not to register the keyword in the dictionary, or whether or not to delete the keyword from the dictionary, based on the assessment value newly calculated by the keyword assessment value calculation unit, and a degree of change between the assessment value newly calculated by the keyword assessment value calculation unit and the assessment value stored in the keyword storage unit; and a dictionary registration and deletion unit which registers or deletes the keyword in the dictionary based on a result of the determination.

Moreover, the dictionary creation device creates a dictionary used for searching, classifying, or filtering information written as text, in which keywords are registered in the dictionary per category, and the dictionary creation device includes: a classification information acquisition unit which acquires classification information regarding the category and text information from at least two information sources which differ from an information source of the information written as text; a keyword extraction unit which extracts a keyword from the text information; a dictionary registration and deletion unit which registers or deletes the extracted keyword in dictionaries corresponding to the respective information sources, in accordance with the category, based upon the classification information acquired by the classification information acquisition unit and the keyword extracted by the keyword extraction unit; and a dictionary combining and editing unit which edits and combines the respective created dictionaries that correspond to each information source.

As has been made clear through the above descriptions, with the dictionary creation device and dictionary creation method according to the present invention, it is possible to appropriately create a dictionary in which effective keywords are registered, in accordance with appearance trends of the keywords which make up the text information group. Moreover, it is possible to consistently keep the dictionary in an optimum state in accordance with changes in the details of the text information group by appropriately replacing keywords in the dictionary. Furthermore, by using a dictionary created in this manner, it is possible to effectively search, classify, and filter TV program information provided by, for example, an Electric Program Guide (EPG).

FURTHER INFORMATION ABOUT TECHNICAL BACKGROUND TO THIS APPLICATION

The disclosure of Japanese Patent Application No. 2003-433872 filed on Dec. 26, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the invention. In the Drawings:

FIG. 17 is a diagram showing an example of data stored in a classification dictionary database;

FIG. 19(a) is an example of a screen when a classified item is selected by a user, and 19(b) is a diagram showing an example of a screen when a URL on the Internet is set;

FIGS. 20A and 20B are diagrams showing examples of text information; 20A is an example of text information regarding a "movie," and 20B is an example of text information regarding "music";

FIG. 21 is a diagram showing an example of a result of extracting a characteristic keyword from text information;

FIG. 22 is a diagram showing an example of data stored in a classification dictionary database;

FIG. 24 is a diagram showing an example of TV program information acquired from EPG data;

FIGS. 30A, 30B, and 30C are diagrams showing examples of data stored in a classification dictionary database; 30A is an example of a case based on classification information acquired from a first information source, 30B is an example of a case based on classification information acquired from a second information source, and 30C is an example of a case based on classification information acquired from a third information source;

FIG. 34 is a diagram showing an example of data stored in a classification dictionary database.

DESCRIPTION OF THE PREFERRED EMBODIMENTS

Figure 1:
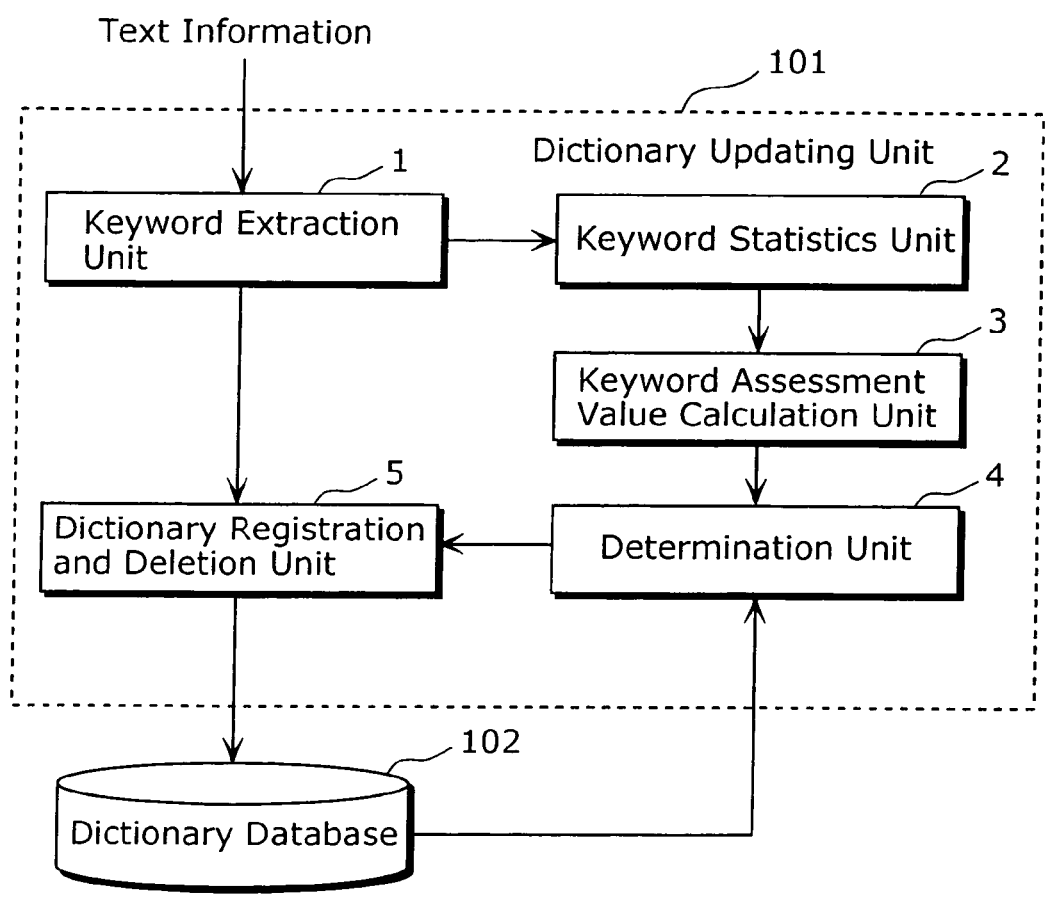
FIG. 1 is a block diagram showing a configuration of a dictionary creation device according to the first embodiment of the present invention.

A dictionary creation device according to the embodiments of the present invention creates a dictionary used for searching, classifying, or filtering information written as text, and includes: a keyword extraction unit which extracts a keyword from a text information group made up of one or more pieces of text information; a keyword statistics unit which finds statistics regarding an appearance of the keyword within the text information group; a keyword assessment value calculation unit which calculates an assessment value for the keyword based on the statistics; a keyword storage unit which stores a pair made up of the keyword and the assessment value of that keyword; a determination unit which determines whether or not to register the keyword in the dictionary, or whether or not to delete the keyword from the dictionary, based on a degree of change between the assessment value newly calculated by the keyword assessment value calculation unit and the assessment value stored in the keyword storage unit; and a dictionary registration and deletion unit which registers or deletes the keyword in the dictionary based on a result of the determination.

According to this, it is possible to appropriately create a dictionary in which effective keywords are registered, in accordance with appearance trends of the keywords which make up the text information group. Moreover, it is possible to consistently keep the dictionary in an optimum state in accordance with changes in the details of the text information group by appropriately replacing keywords in the dictionary.

In addition, keywords for which the assessment value from a previous processing is stored are updated in the dictionary based on a degree of change between the assessment value from the previous processing and the present assessment value; thus it is possible to update keywords, the appearance frequency of which undergoes significant changes, that make up the text information group in the dictionary.

Moreover, the assessment value calculated by the keyword assessment value calculation unit may be an inverse document frequency (idf) value of the keyword based on a total number of pieces of text information in the text information group and a number of pieces of text information that include the keyword, and the determination unit may determine to register the keyword in the dictionary in the case where the keyword is not yet registered in the dictionary and the idf value or a degree of change in the idf value are each greater than or equal to respective predetermined threshold values.

In addition, the determination unit may determine to delete the keyword from the dictionary in the case where the keyword is already registered in the dictionary and a degree of change in the idf value is less than respective predetermined threshold values.

A smaller idf value indicates that a keyword is "less rare" and appears in any of the units of text information; conversely, a large idf value indicates a keyword that is only included in some of the units of text information. Thus, it is possible to appropriately create a dictionary in which keywords effective for searching and classifying text are registered.

In addition, a dictionary creation device according to the embodiments of the present invention creates a dictionary used for searching, classifying, or filtering information written as text, and includes: a keyword extraction unit which extracts a keyword from a text information group made up of one or more pieces of text information; a keyword statistics unit which finds statistics regarding an appearance of the keyword within the text information group; a keyword assessment value calculation unit which calculates an assessment value for the keyword based on the statistics; a keyword storage unit which stores a pair made up of the keyword and the assessment value of that keyword; a determination unit which determines whether or not to register the keyword in the dictionary, or whether or not to delete the keyword from the dictionary, based on the assessment value newly calculated by the keyword assessment value calculation unit, and a degree of change between the assessment value newly calculated by the keyword assessment value calculation unit and the assessment value stored in the keyword storage unit; and a dictionary registration and deletion unit which registers or deletes the keyword in the dictionary based on a result of the determination.

According to this, it is possible to appropriately create a dictionary in which effective keywords are registered, in accordance with appearance trends of the keywords which make up the text information group. Moreover, it is possible to consistently keep the dictionary in an optimum state in accordance with changes in the details of the text information group by appropriately replacing keywords in the dictionary. In addition, keywords for which the assessment value from a previous processing is stored are updated in the dictionary based on a degree of change between the assessment value from the previous processing and the present assessment value, as well as the present assessment value; thus it is possible to update keywords, the appearance frequency of which undergoes significant changes, that make up the text information group in the dictionary.

Moreover, the assessment value calculated by the keyword assessment value calculation unit may be an inverse document frequency (idf) value of the keyword based on a total number of pieces of text information in the text information group and a number of pieces of text information that include the keyword, and the determination unit may determine to register the keyword in the dictionary in the case where the keyword is not yet registered in the dictionary and the idf value or a degree of change in the idf value are each greater than or equal to respective predetermined threshold values.

In addition, the determination unit may determine to delete the keyword from the dictionary in the case where the keyword is already registered in the dictionary and the idf value or a degree of change in the idf value are each less than respective predetermined threshold values.

Moreover, the text information group may be made up of one or more pieces of text information that have been given, in advance, information of a category to which the one or more pieces of text information belong; the keyword statistics unit may find statistics regarding the category within the text information group; and the keyword assessment value calculation unit may calculate the assessment value for extracted keyword based on statistics regarding an appearance of the keyword and the statistics regarding the category.

According to this, it is possible to calculate the assessment value with a low dependency on already provided category classifications, and thus it is possible to reduce the influence of dependency on the category classifications in the text information for keywords to be registered.

In addition, a dictionary creation device according to the embodiments of the present invention creates a dictionary used for searching, classifying, or filtering information written as text, in which keywords are registered in the dictionary per category, and the device includes: a keyword extraction unit which extracts, from text information, a keyword, the appearance frequency in a predetermined period of which has exceeded a predetermined threshold value; and a dictionary registration and deletion unit which registers or deletes the keyword, extracted by the keyword extraction unit, as a topical characteristic keyword, in the case where the keyword is not registered in the category, along with time information regarding the predetermined period.

Through this, it is possible to create a dictionary that responds to changes in the times; for example, a dictionary in which characteristic keywords such as topical proper nouns acquired from media such as the Internet and an eNewspaper are registered as topical characteristic keywords. Furthermore, through using a dictionary created in this manner, it is possible to realize highly-accurate TV program information provided by, for example, and EPG.

In addition, a dictionary creation device according to the embodiments of the present invention creates a dictionary used for searching, classifying, or filtering information written as text, in which keywords are registered in the dictionary per category, and includes: a classification information acquisition unit which acquires classification information regarding the category and text information from at least two information sources which differ from an information source of the information written as text; a keyword extraction unit which extracts a keyword from the text information; and a dictionary registration and deletion unit which registers or deletes the extracted keyword in dictionaries corresponding to the respective information sources, in accordance with the category, based upon the classification information acquired by the classification information acquisition unit and the keyword extracted by the keyword extraction unit.

According to this, it is possible to create a plurality of dictionaries corresponding to classification information from a plurality of information sources. In addition, by using classification information that is used in daily life and thus is easily understood by a user, it is possible to classify, for example, TV program information provided by an EPG, making it possible to manage TV programs and information with uniform classifications.

Furthermore, the dictionary creation device may include a dictionary combining and editing unit which edits and combines the respective created dictionaries that correspond to each information source.

According to this, it is possible to build a dictionary with new classification levels, which has gathered together the classification information of each classification dictionary database. In addition, by using a dictionary created in this manner, it is possible to, for example, classify an EPG TV program chart from a new perspective.

Note that while it is possible to realize the present invention as this kind of dictionary creation device, it is also possible to realize the present invention as a dictionary creation method, in which the characteristic units included in the dictionary creation device are implemented as steps, and as a program which causes a computer to execute those steps. It goes without saying that such a program can be distributed via a storage medium such as a CD-ROM or a transmission medium such as the Internet. In addition, it is also possible to realize the present invention as an EPG TV program search system that includes this kind of dictionary creation device.

Hereafter, each embodiment of the present invention shall be described with reference to the drawings.

First Embodiment

FIG. 1 is a block diagram showing a configuration of a dictionary creation device according to the first embodiment of the present invention.

A dictionary creation device 100 is a device for creating a dictionary (dictionary database) used for searching, classifying, filtering, or the like of information written as text, and includes: a dictionary updating unit 101, which extracts a keyword (term) from an inputted text information group and registers the keyword to be registered in a dictionary database; and a dictionary database 102. There are cases where the dictionary database 102 is used as an extraction dictionary, and cases where the dictionary database is used as an unnecessary word dictionary, depending on the application.

First, an example of how these dictionaries are used is given.

For example, assuming that a text information group is information regarding a TV program, the text information group is used as a dictionary for keyword extraction or keyword exclusion when extracting a characteristic keyword from text information of a TV program previously viewed by a viewer and creating a profile that expresses the viewer's tastes. In addition, the text information group is used as a dictionary for keyword extraction or keyword exclusion when extracting, from the text information of a TV program about to be broadcast, a keyword that expresses a characteristic of the TV program.

In addition, for example, in the case of recommending a TV program that suits the viewer's tastes from among TV programs about to be broadcast, it is possible to specify the TV program that suits the viewer's tastes by searching for a keyword that expresses a characteristic of the TV program about to be broadcast based on the profile created in the abovementioned manner. Similarly, it is also possible to specify the TV program that suits the viewer's tastes from a TV program accumulated in a high-capacity volume, such as, for example, a Hard Disk Drive (HDD) recorder.

Moreover, when classifying TV programs by category, such as, for example, "the economy," "sports," "lifestyle," and so on, the text information of the TV program can be used as a classification dictionary in which keywords that express a characteristic of the category are registered per category.

The dictionary updating unit 101 includes a keyword extraction unit 1, a keyword statistics unit 2, a keyword assessment value calculation unit 3, a determination unit 4, and a dictionary registration and deletion unit 5.

The keyword extraction unit 1 extracts a keyword from inputted text information. The keyword statistics unit 2 finds statistics regarding appearances of the extracted keyword, such as, for example, an overall number of units of text information in the inputted text information group and a number of units of text information that include the extracted keyword. The keyword assessment value calculation unit 3 calculates an assessment value of the extracted keyword based on the statistics regarding appearances of the keyword found by the keyword statistics unit 2. The determination unit 4 determines whether or not to register the keyword in the dictionary database 102, or determines whether or not to delete the keyword from the dictionary database 102, based on the assessment value calculated by the keyword assessment value calculation unit 3. The dictionary registration and deletion unit 5 registers the keyword in the dictionary database 102 or deletes the keyword from the dictionary database 102 depending on a determination result from the determination unit 4.

Next, an operation of the dictionary creation device 100 configured as above is described.

Figure 2:
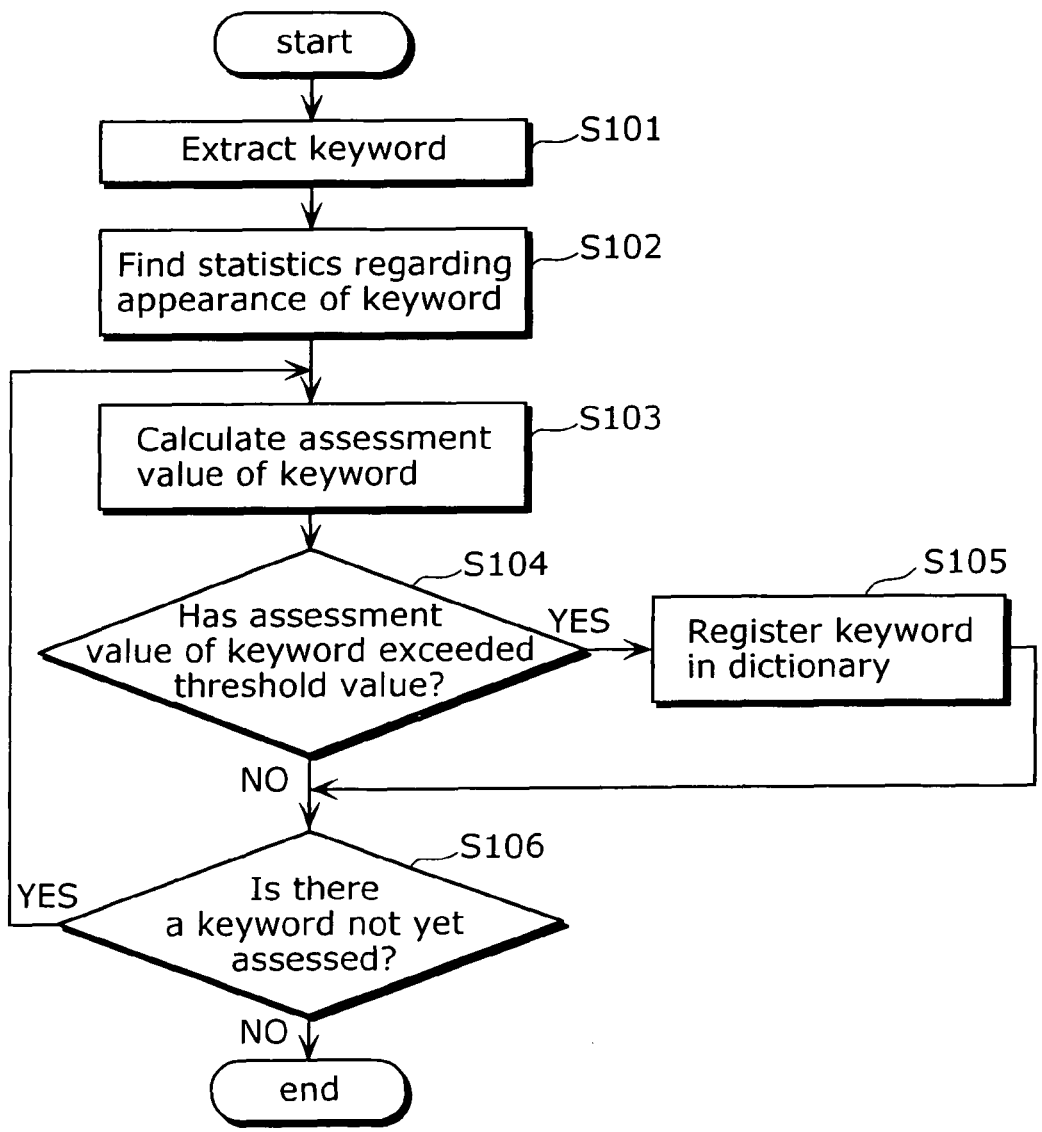
FIG. 2 is a flowchart showing an operational flow when an extraction dictionary is created as a dictionary database in the dictionary creation device according to the first embodiment of the present invention.

FIG. 2 is a flowchart showing an operational flow when an extraction dictionary is created as a dictionary database in the dictionary creation device 100, and hereafter, a creation process of the extraction dictionary is described in accordance with this flowchart.

Figures 3A, 3B, 3C:
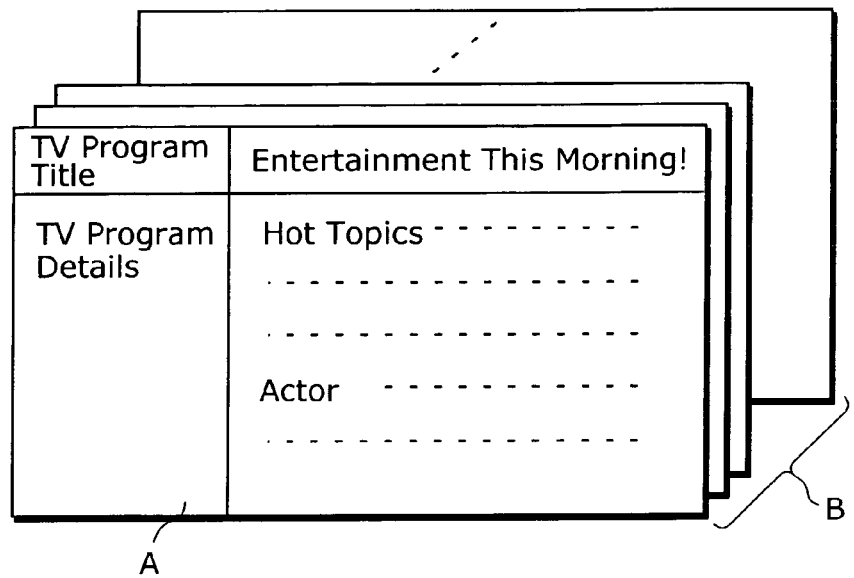
FIG. 3A is a diagram describing text information and a text information group, 3B is a diagram describing statistics related to an appearance of a keyword, and 3C is a diagram showing an example of an assessment value of a keyword.

When a text information group B configured of one or more units of text information, as shown in, for example, FIG. 3A, is inputted into the dictionary updating unit 101, the keyword extraction unit 1 extracts the keyword from all units of text information within the text information group (step S101). Here, keyword extraction may be performed by a generally-used method such as generic morphological analysis, a slicing rule that uses a transition between character types (Japanese characters of kanji, hiragana, katakana, and so on) as an endpoint node, and the like.

At this time, the keyword statistics unit 2 finds statistics about the appearance of the keyword extracted by the keyword extraction unit 1, and notifies the keyword assessment value calculation unit 3 (step S102). Here, the keyword statistics unit 2 finds a total number of units of text information A in the inputted text information group B and a number of units of text information which include the extracted keyword, as shown in, for example, FIG. 3A.

Next, the keyword assessment value calculation unit 3 calculates an assessment value, as shown in, for example, FIG. 3C, for the keyword extracted by the keyword extraction unit 1, based on the statistics regarding the appearance of the keyword notified by the keyword statistics unit 2 (step S103). Here, the keyword assessment value calculation unit 3 calculates an idf (inverse document frequency) value as the assessment value. As shown below in formula 1, the idf value idf (t) for a keyword t is found from a total number N of units of text information contained within the text information group and a number n(t) of texts that include the keyword t from among the N units of text information.

$$idf(t) = \log\left(\frac{N}{n(t)}\right) + 1 \qquad \text{(Formula 1)}$$

The idf value is 1 in the case where the keyword t appears in all the units of text information in the N text information groups, and increases monotonically as the number of the texts n(t) in which the keyword t appears decreases. In other words, it may be said that the keyword t is more of a "common" keyword that appears in any of the units of text information the smaller the idf value is, and conversely, that the keyword is included only in some of the text information the larger the idf value is.

Next, the determination unit 4 determines whether or not the idf value calculated as the assessment value is greater than or equal to a predetermined threshold value C (step S104). Here, it is assumed that a keyword greater than or equal to the predetermined threshold value C is employed as a keyword that composes the extraction dictionary. Because this extraction dictionary is used in searching and classifying text information, it exists having bias within the text information group, and thus must be composed of keywords expressing relative characteristics for individual units of text information within the text information group. Thus, a determination criterion is employed in which the idf(t) is greater than or equal to a certain constant value.

Therefore, in the case where the above determination result shows an idf value greater than or equal to the predetermined threshold value C (YES of step S104), the determination unit 4 notifies the dictionary registration and deletion unit 5 that the keyword t is to be registered into the dictionary database 102 (in the present embodiment, the extraction dictionary). The dictionary registration and deletion unit 5 registers the keyword t in the dictionary database 102 (step S105). On the other hand, in the case where the above determination result shows an idf value of less than the predetermined threshold value C (NO of step S104), the determination unit 4 does not notify the dictionary registration and deletion unit 5 that the keyword t is to be registered into the dictionary database 102.

Next, the determination unit 4 determines whether or not there is a keyword that has not yet been assessed (step S106). In the case where the determination result shows that there is a keyword that has not yet been assessed (YES of step S106), the determination unit 4 performs calculation processing of the assessment value for the next keyword (step S103). On the other hand, in the case where there is no keyword that has not yet been assessed, or in other words, the case where each processing has been finished for all the keywords extracted by the keyword extraction unit 1 (NO of step S106), the series of operations comes to an end.

In such a manner, the keyword is registered in the dictionary based on the assessment value of the keyword extracted from the text information group; therefore, it is possible to appropriately create the dictionary database 102, in which keywords effective for searching and classifying text are registered.

Figure 4:
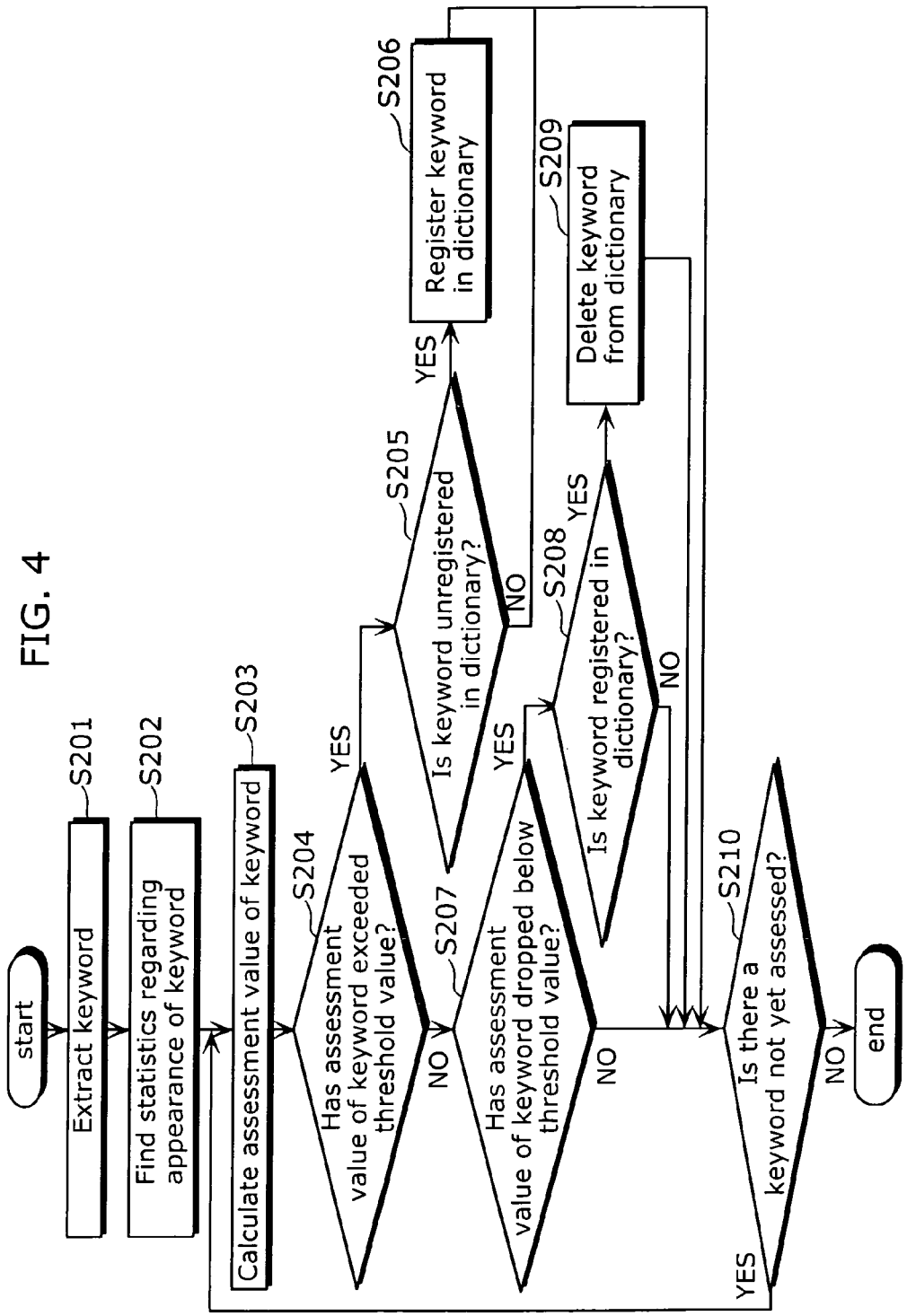
FIG. 4 is a flowchart showing an operational flow when a dictionary database is updated in the dictionary creation device according to the first embodiment of the present invention.

FIG. 4 is a flowchart showing an operational flow when the dictionary database 102, which has been created, is updated in the dictionary creation device 100; the update process in described hereafter in accordance with this flowchart. Note that descriptions of operations identical to those of creating the dictionary database 102, as shown in FIG. 2, are omitted.

First, operations from the keyword extraction process performed by the keyword extraction unit 1 (step S201) to the assessment value determination process performed by the determination unit 4 (step S204) are identical to when creating the dictionary database 102, as shown in FIG. 2 (step S101 to step S104).

Next, in the case where the above determination result shows an idf value greater than or equal to the predetermined threshold value C (YES of step S204), the determination unit 4 searches the dictionary database 102 and determines whether or not that keyword is not yet registered in the dictionary database 102 (step S205). Here, in the case where the keyword t is not yet registered in the dictionary database 102 (YES of step S205), the determination unit 4 notifies the dictionary registration and deletion unit 5 that the keyword t is to be registered into the dictionary database 102. The dictionary registration and deletion unit 5 additionally registers the keyword t into the dictionary database 102 (step S206).

On the other hand, in the case where the above determination result shows an idf value less than the predetermined threshold C (NO of step S204), the determination unit 4 determines whether or not the idf value calculated as the assessment value is less than a predetermined threshold value C' (step S207). In the case where, as a result of this judgment, the idf value is less than the predetermined threshold value C' (YES of step S207), the determination unit 4 searches the dictionary database 102 and determines whether or not the keyword t is already registered in the dictionary database 102 (step S208). Here, in the case where the keyword t is still registered in the dictionary database 102 (YES of step S208), the determination unit 4 notifies the dictionary registration and deletion unit 5 that the keyword t is to be deleted from the dictionary database 102. The dictionary registration and deletion unit 5 then deletes that keyword t from the dictionary database 102 (step S209).

Next, the determination unit 4 determines whether or not there is a keyword which has not yet been assessed (step S210). In the case where, as a result of this judgment, there is a keyword which has not yet been evaluated (YES of step S210), the determination unit 4 performs calculation processing of the assessment value (step S203) for the next keyword. On the other hand, in the case where there is not a keyword which has not been assessed, or in other words, in the case where each processing has finished for all keywords extracted by the keyword extraction unit 1 (NO of step S210), the series of operations ends.

Figure 5:
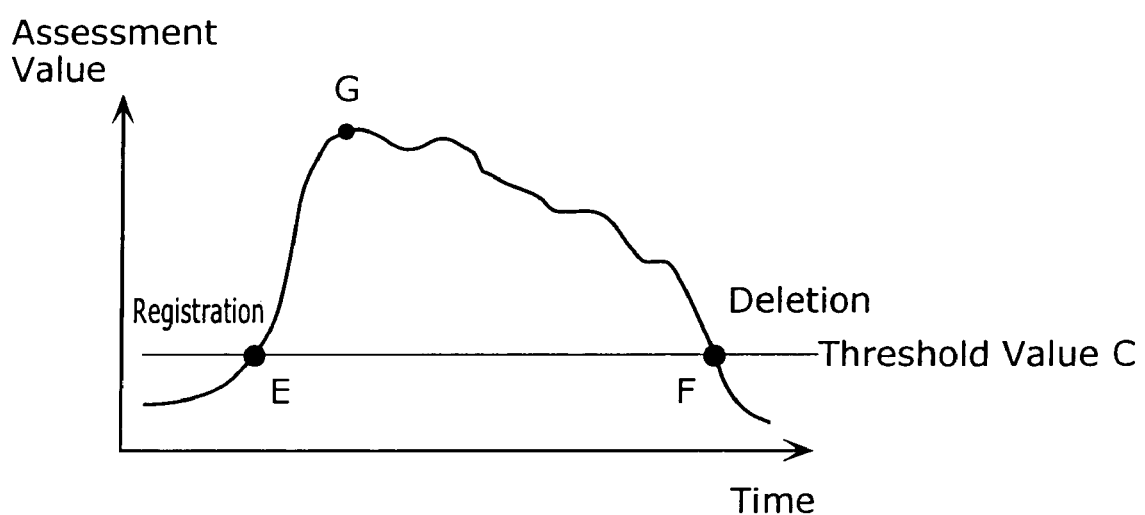
FIG. 5 is a diagram showing an example of a change, over time, of an assessment value of a keyword in the first embodiment of the present invention.

FIG. 5 is a diagram showing an example of a change, over time, of an assessment value of a keyword. In FIG. 5, the assessment value gradually increases, and at a point E, the assessment value exceeds the threshold value C, and thus is registered in the dictionary database 102. After that, the assessment value continues to increase, but begins to decrease at a point G, and drops below the threshold value C at a point F. Therefore, this keyword is deleted from the dictionary database 102 at the point F.

As described above, the already-existing content of the dictionary database 102 is updated in accordance with the tendency for keywords that compose the text information group to appear, and therefore it is possible to construct an appropriate dictionary in accordance with a change in the content of the text information group.

Note that during the operation of updating the dictionary database 102, as shown in FIG. 4, a relationship between the threshold value C at the time of registering a keyword and the threshold value C' at the time of deleting a keyword may be either C=C' or C>C'. Particularly in the case of the latter, because the measure for deleting a keyword is lower than the measure for registering a keyword, it tends to be difficult to delete a keyword that has been registered once. Therefore, even in the case where the assessment value drops due to a temporary fluctuation in the tendency for a keyword to appear, it is possible to maintain a dictionary with stable content without continually repeating the process of registering and deleting keywords.

In addition, in the present embodiment, the extraction dictionary is described as the dictionary database 102, but it is also possible to create and update an unnecessary word dictionary through the same procedure. However, in such a case, the criteria for determining the assessment value for registering and deleting the keywords differ from those of the extraction dictionary. To be more specific, in the processing of determining the assessment value during the operation of creating the dictionary database 102 (step S104), as shown in FIG. 2, it is necessary for the keywords registered as the dictionary to have assessment values smaller than the threshold value C, or in other words, idf(t)<C is required. In the same manner, in the processing of determining the assessment value at the time of registering a keyword during the operation of updating the dictionary database 102 (step S204), as shown in FIG. 4, idf(t)<C is a condition for determination; in the processing of determining the assessment value at the time of deleting a keyword (step S207), idf(t)>C' is the condition for determination.

Through this, the idf value is a low value for the unnecessary word dictionary, in which it is necessary to register keywords that are useless for searching and classifying the text information and which cannot express characteristics unique to text information, and thus it is possible to register keywords which do not have characteristics that appear in any of the units of text information.

In addition, in the present embodiment, an example in which the idf value is used as the assessment value of the keyword is described; however, anything can be used as the assessment value as long as it is an indicator that shows a weight, idiosyncrasy, appearance frequency, and the like of the keyword within the text information group. However, it is necessary to appropriately set the determination conditions for registration and updating in the dictionary database 102 in accordance with a fluctuation trend (monotonic increase, monotonic decrease) of the assessment value that is employed.

For example, a tf/idf value, which crosses the appearance frequency (tf value) of the keyword in the text information group with the idf value, is an indicator that takes both a bias (rarity) of the appearance of the keyword in the text information group and the appearance frequency into consideration, and can be used as the keyword assessment value. Or, the appearance frequency alone can be used as the keyword assessment value.

Next, an example in which the dictionary creation device 100 configured as above is incorporated into an Electric Program Guide (EPG) TV program search system is described hereafter.

Figure 6:
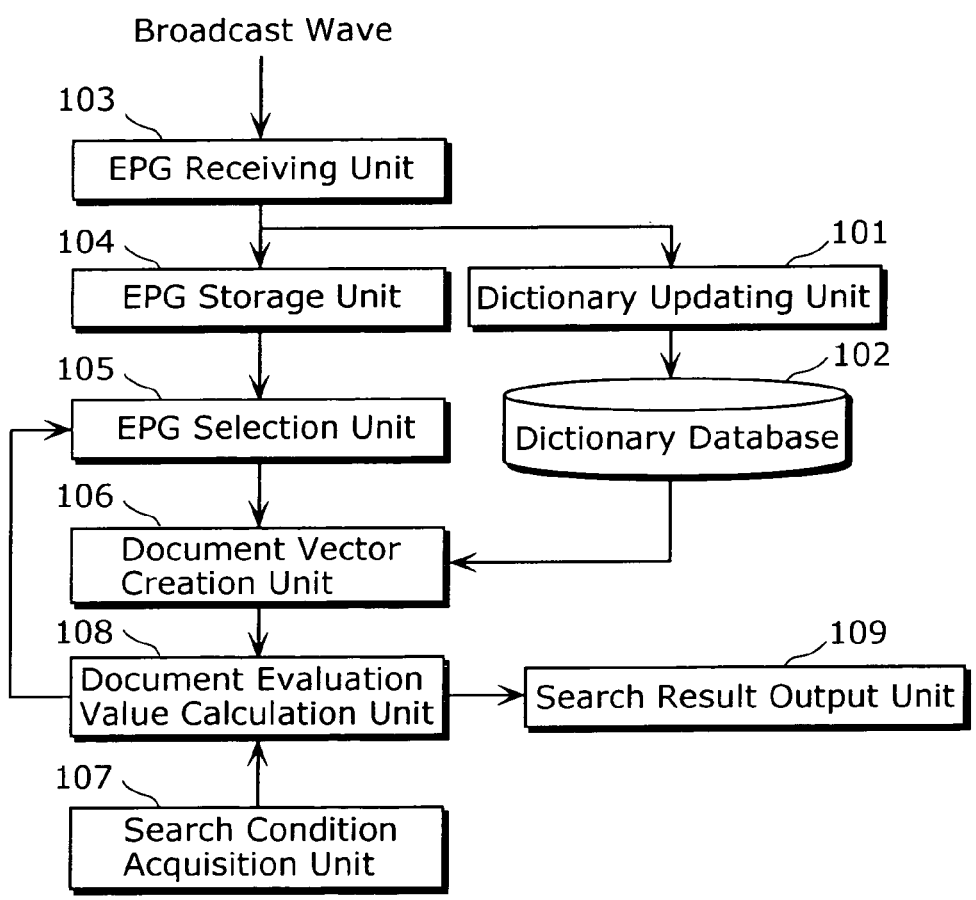
FIG. 6 is a block diagram showing a configuration of an EPG TV program search system included in the dictionary creation device according to the first embodiment of the present invention.

FIG. 6 is a block diagram showing a configuration of an EPG TV program search system included in the dictionary creation device according to the first embodiment of the present invention.

This EPG TV program search system is a system that searches, based upon a search condition, EPG data received from a broadcast wave, and includes: the dictionary updating unit 101, the dictionary database 102, an EPG receiving unit 103, an EPG storage unit 104, an EPG selection unit 105, a document vector creation unit 106, a search condition acquisition unit 107, a document evaluation value calculation unit 108, and a search result output unit 109.

The EPG receiving unit 103 receives and decodes the EPG data from the broadcast wave. The EPG storage unit 104 stores the EPG data received by the EPG receiving unit 103. The EPG selection unit 105 selects the EPG data stored in the EPG storage unit 104. The document vector creation unit 106 uses the dictionary database 102 from the EPG data selected by the EPG selection unit 105 and creates a document vector composed of a combination of a keyword and its weight. The search condition acquisition unit 107 acquires the search condition for the EPG data inputted by a user, the search condition being in a vector format composed of the combination of a keyword and its weight. The document evaluation value calculation unit 108 takes a cosine of the search condition acquired by the search condition acquisition unit 107 and the document vector of the EPG data stored in the EPG storage unit 104 and calculates the evaluation value; the EPG data is selected based on that evaluation value. The search result output unit 109 outputs the evaluation value calculated by the document evaluation value calculation unit 108 or the EPG data selected based on that evaluation value.

As described above, with the EPG TV program search system configured in this manner, by finding the evaluation value for EPG data that has been document-vectorized using the dictionary database 102 through the one or more search conditions of vector formats acquired by the search condition acquisition unit 107, and outputting the EPG data in order from the highest evaluation value, it is possible to search the EPG data in an order that matches the search condition set by the user.

In addition, because the dictionary database 102 is further updated by the dictionary updating unit 101, it is possible to maintain a dictionary database 102 that is suitable for searching and classifying the EPG data, while flexibly responding to significant modifications of broadcasted programs due to TV program reorganization, fluctuations in TV program trends due to significant events and happenings, and furthermore, future changes in content written in the EPG due to changes in broadcasting style and so on.

Note that in the present embodiment, the search condition acquisition unit 107 acquires the search condition inputted by the user, but this is not intended to limit the embodiment. For example, if the search condition acquisition unit 107 is configured so as to acquire a generated vector of the search condition from the EPG data of a TV program which the user views, it is possible to realize a so-called "recommended TV program presentation" function which searches and presents a TV program in accordance with a viewing trend, without explicitly receiving an instruction regarding the search condition from the user.

In addition, television broadcasting currently provides a plurality of broadcast waves, such as ground wave broadcast, BS broadcast, and CS broadcast. Trends within each broadcast, such as the details and actors in the broadcasted TV programs, differ. Thus, for creating and updating the dictionary, the EPG data may be classified per broadcast wave and used as the text information group. The EPG data may further be subdivided and classified per broadcast station.

In addition, in a similar manner, the EPG classified by time period may be used as the text information group, and the dictionary may be created/updated in each time period. For example, a broadcast time period is divided into morning, afternoon, evening, prime time, and late night, and a dictionary is created for each of those time periods. In this manner, it is possible to reflect, for example, a keyword that does not appear often throughout the overall time period, but which appears frequently in the morning, by creating dictionaries that differ depending on the time period.

Second Embodiment

Figure 7:
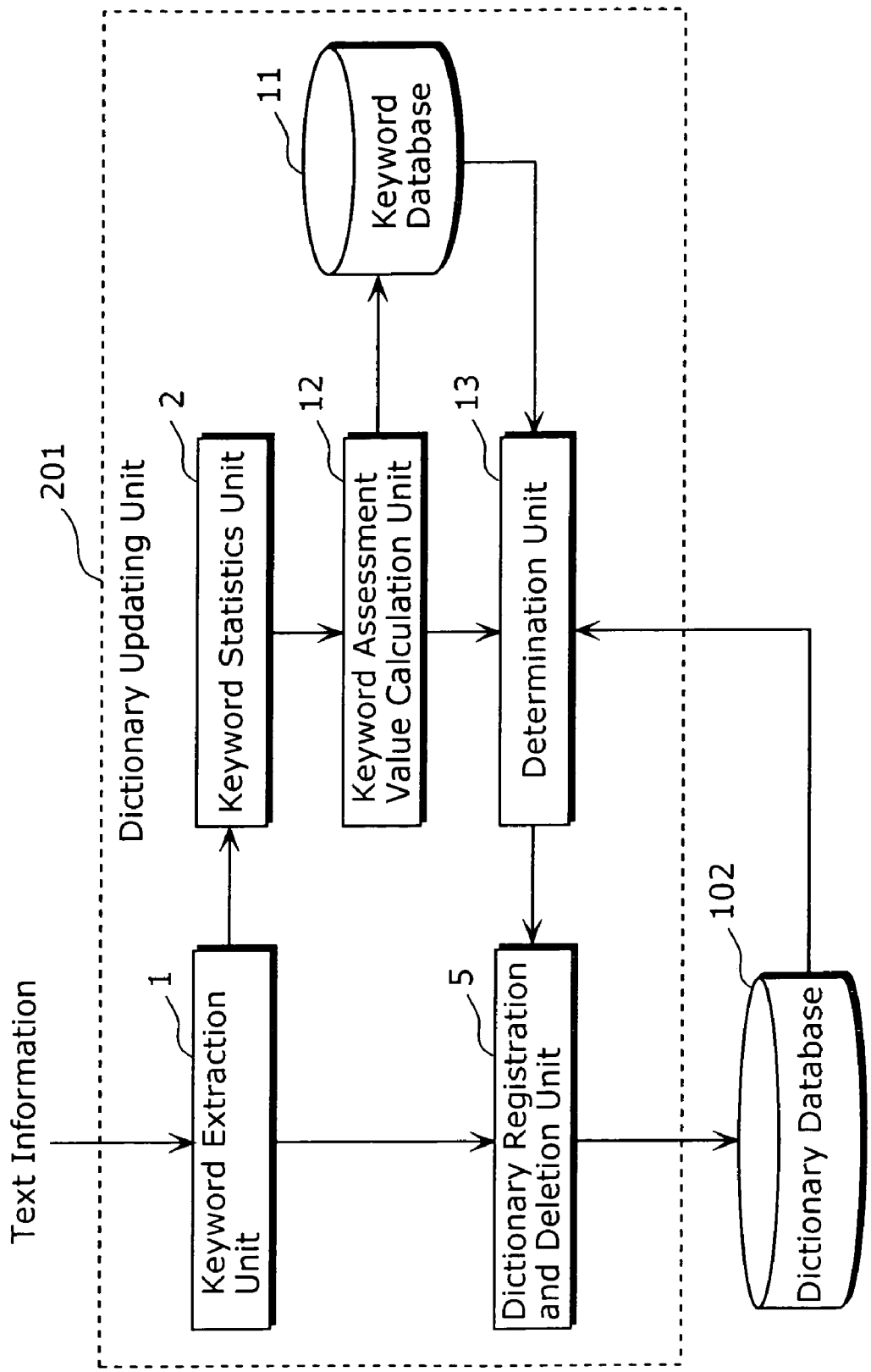
FIG. 7 is a block diagram showing a configuration of a dictionary creation device according to the second embodiment of the present invention.

FIG. 7 is a block diagram showing a configuration of a dictionary creation device according to the second embodiment of the present invention. Note that parts identical to those of the first embodiment are given identical numbers, and descriptions are omitted.

In a dictionary updating unit 201 of a dictionary creation device 200, a keyword database 11 is added to the configuration of the dictionary updating unit 101 of the first embodiment.

The keyword assessment value calculation unit 12 calculates an assessment value of an extracted keyword based on statistics regarding appearances of the keyword found by the keyword statistics unit 2, notifies the determination unit 13 of the keyword and that assessment value, and also stores the keyword and that assessment value in the keyword database 11.

The determination unit 13 determines whether or not to register the keyword in the dictionary database 102, or whether or not to delete the keyword from the dictionary database 102, based on a degree of change between the assessment value newly calculated by the keyword assessment value calculation unit 12 and the assessment value stored in the keyword database 11.

The keyword database 11 stores all the keywords and the assessment values extracted with keyword extraction unit 1 regardless of whether or not they are stored in the dictionary database 102, at the time when the previous keyword is registered/updated in the dictionary database 102.

Next, an operation of the dictionary creation device 200 configured as above is described.

Figure 8:
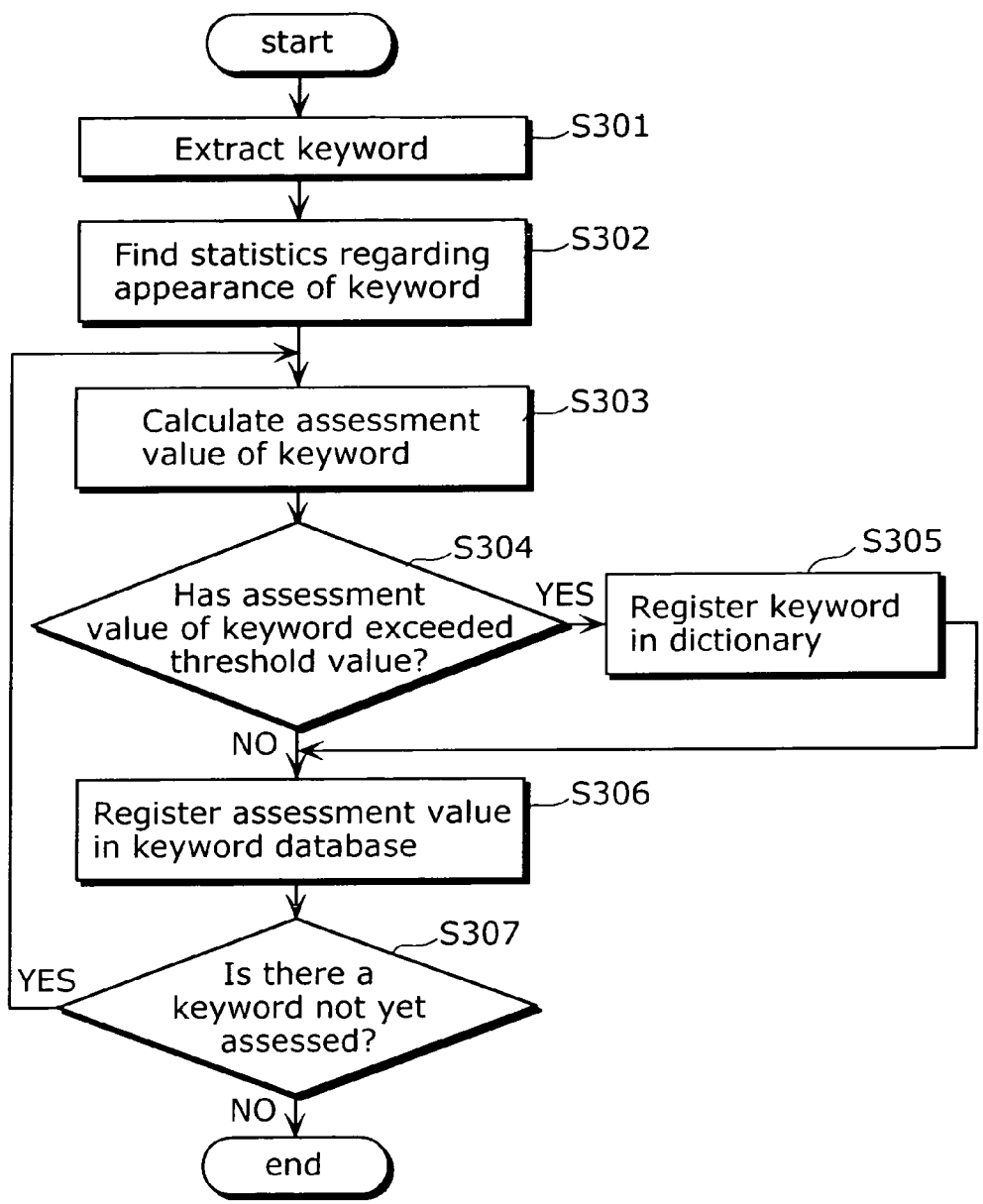
FIG. 8 is a flowchart showing an operational flow when an extraction dictionary is created as a dictionary database in the dictionary creation device according to the second embodiment of the present invention.

FIG. 8 is a flowchart showing an operational flow when an extraction dictionary is created as a dictionary database in the dictionary creation device 200, and hereafter, a creation process of the extraction dictionary is described in accordance with this flowchart. Note that descriptions of operations identical to those of the first embodiment are omitted.

First, from the extraction processing performed by the keyword extraction unit 1 for extracting the keyword (step S301) to the determination processing performed by the determination unit 13 for determining the assessment value (step S304), and the registration processing performed by the dictionary registration and deletion unit 5 for registration in the dictionary database 102 (step S305), are the same as the case where the dictionary database 102 is created, as shown in FIG. 2 (step S101 to step S105).

Next, the keyword assessment value calculation unit 12 stores a pair of the extracted keyword and the assessment value in the keyword database 11 (step S306). At this time, the entirety of the extracted pair of the keyword and the assessment value is stored in the keyword database 11, regardless of whether or not that keyword has been registered in the dictionary database 102.

Next, the determination unit 13 determines whether or not there is a keyword that has not yet been assessed (step S307). In the case where, as a result of this judgment, there is a keyword which has not yet been evaluated (YES of step S307), the determination unit 13 performs calculation processing of the assessment value (step S303) for the next keyword. On the other hand, in the case where there is no keyword that has not yet been assessed, or in other words, the case where each processing has been finished for all the keywords extracted by the keyword extraction unit 1 (NO of step S307), the series of operations comes to an end.

Figure 9:
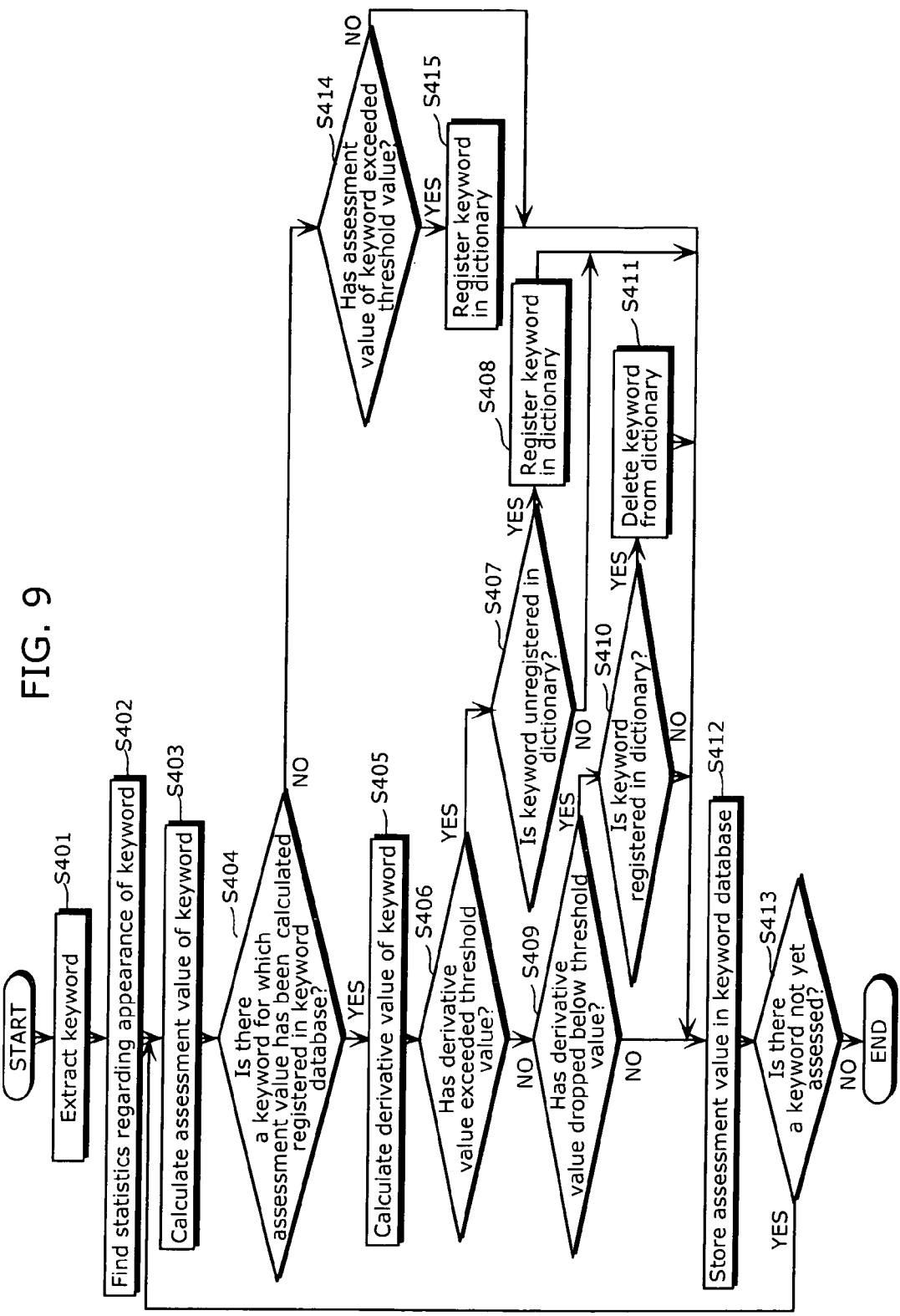
FIG. 9 is a flowchart showing an operational flow when a dictionary database is updated in the dictionary creation device according to the second embodiment of the present invention.

FIG. 9 is a flowchart showing an operational flow when the dictionary database 102, which has been created, is updated in the dictionary creation device 200; the update process in described hereafter in accordance with this flowchart. Note that descriptions of operations identical to those of the first embodiment are omitted. First, operations from the keyword extraction process performed by the keyword extraction unit 1 (step S401) to the assessment value calculation process performed by the keyword assessment value calculation unit 12 (step S403) are identical to when creating the dictionary database 102 as shown in FIG. 2 (step S101 to step S103).

Next, the keyword assessment value calculation unit 12 searches the keyword database 11 for a keyword t, the assessment value of which has been calculated, and determines whether or not the assessment value at the time of the previous processing has been stored (step S404). As a result of this judgment, in the case where the assessment value at the time of the previous processing has been stored in the keyword database 11 (YES of step S404), the keyword assessment value calculation unit 12 reads out the assessment value at the time of the previous processing from the keyword database 11, and calculates a derivative value between the assessment value at the time of the previous processing and the assessment value calculated presently (step S405). This calculated derivative value is a positive value if the idf(t), which is the assessment value for the keyword t, has increased as opposed to the previous time, and is a negative value if the idf(t) has decreased; it can also be said that the larger the absolute value of that idf(t), the higher the amount of change.

Note that the calculation of this derivative value is not limited to the difference between the present assessment value and the previous assessment value (first delay). For example, it may be a difference between the present assessment value and the assessment value twice previous (second delay), a difference between an assessment value even further previous (nth delay), and so on; any indicator attributed to a fluctuation in the assessment value of the keyword is possible.

Next, the determination unit 13 determines whether or not the calculated derivative value is greater than or equal to a predetermined threshold value D (step S406). In the case where the above determination result shows a derivative value greater than or equal to the predetermined threshold value D (YES of step S406), the determination unit 13 searches the dictionary database 102, and determines whether or not that keyword is not yet registered in the dictionary database 102 (step S407). Here, in the case where the keyword t is not yet registered in the dictionary database 102 (YES of step S407), the determination unit 13 notifies the dictionary registration and deletion unit 5 that the keyword t is to be registered into the dictionary database 102. The dictionary registration and deletion unit 5 additionally registers the keyword t into the dictionary database 102 (step S408).

On the other hand, in the case where the above determination result shows a derivative value less than the predetermined threshold D (NO of step S406), the determination unit 13 determines whether or not the derivative value calculated as the assessment value is less than a predetermined threshold value D' (step S409). In the case where, as a result of this determination, the derivative value is less than the predetermined threshold value D' (YES of step S409), the determination unit 13 searches the dictionary database 102 and determines whether or not the keyword t is already registered in the dictionary database 102 (step S410). Here, in the case where the keyword t is still registered in the dictionary database 102 (YES of step S410), the determination unit 13 notifies the dictionary registration and deletion unit 5 that the keyword t is to be deleted from the dictionary database 102. The dictionary registration and deletion unit 5 deletes that keyword t from the dictionary database 102 (step S411).

Next, the keyword assessment value calculation unit 12 stores a pair of the extracted keyword and the assessment value (the assessment value of a stage before finding the derivative value) in the keyword database 11 (step S412). At this time, the entirety of the extracted pair of the keyword and the assessment value is stored in the keyword database 11, regardless of whether or not that keyword has been registered in the dictionary database 102 or deleted.

Next, the determination unit 13 determines whether or not there is a keyword which has not yet been assessed (step S413). In the case where, as a result of this judgment, there is a keyword which has not yet been evaluated (YES of step S413), the determination unit 13 performs calculation processing of the assessment value (step S403) for the next keyword. On the other hand, in the case where there is no keyword that has not yet been assessed, or in other words, the case where each processing has been finished for all the keywords extracted by the keyword extraction unit 1 (NO of step S413), the series of operations comes to an end.

In addition, when determining whether or not the assessment value at the time of the previous processing has been stored in the keyword database 11 (step S404), in the case where the assessment value at the time of the previous processing has not been stored in the keyword database 11 (NO of step S404), after the determination unit 13 performs the determination processing for determining the assessment value (step S414) and the dictionary registration and deletion unit 5 performs the registration processing for registration in the dictionary database 102 (step S415), storage processing for storing the pair of the keyword and the assessment value in the keyword database 11 is performed by the keyword assessment value calculation unit 12 (step S412), in the same manner as when creating the dictionary database 102, as shown in FIG. 8.

Figure 10:
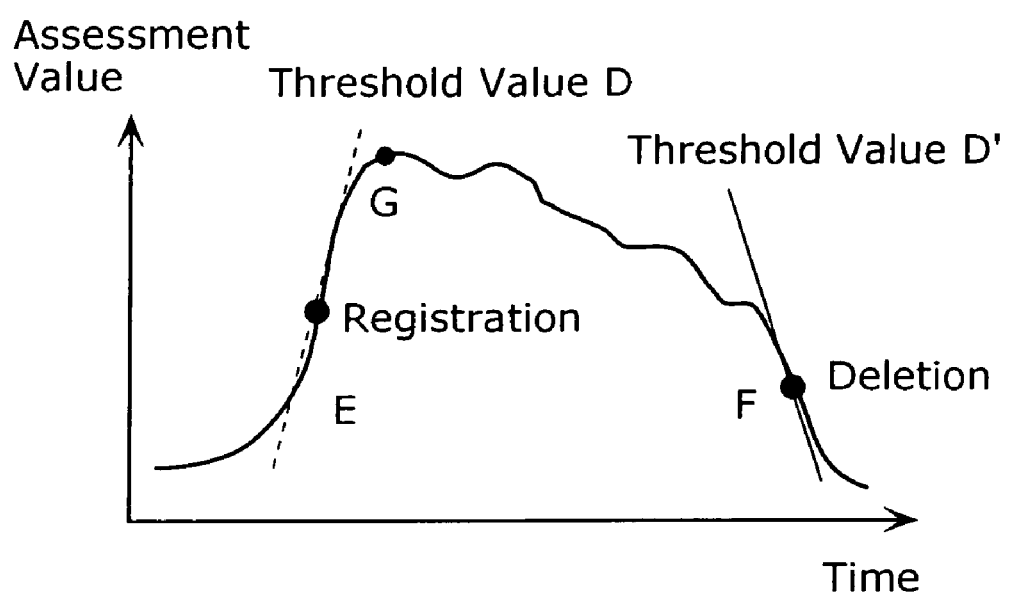
FIG. 10 is a diagram showing an example of a change, over time, of an assessment value of a keyword in the second embodiment of the present invention.

FIG. 10 is a diagram showing an example of a change, over time, of an assessment value of a keyword. In FIG. 10, the assessment value gradually increases, and at a point E, the derivative value of the assessment value exceeds the threshold value D, and thus is registered in the dictionary database 102. After that, the assessment value continues to increase, but begins to decrease at a point G, and at a point F, the derivative value of the assessment value drops below the threshold value D'. Therefore, this keyword is deleted from the dictionary database 102 at the point F.

In such a manner, the keyword is registered in the dictionary based on the assessment value of the keyword extracted from the text information group; therefore, it is possible to appropriately create the dictionary database 102 for searching and classifying text.

Furthermore, regarding keywords for which the extracted keyword and assessment value are registered in the keyword database 5, and for which the assessment value at the time of the previous processing has been stored, updating the dictionary database 102 is carried out based on the derivative value between the assessment value at the time of the previous processing and the assessment value presently calculated; therefore, it is possible to update the content of a dictionary for keywords that make up the text information group, in which there is a marked fluctuation in the appearance.

Note that in the present embodiment, the extraction dictionary is described as the dictionary database 102, but it is also possible to create and update an unnecessary word dictionary through the same procedure. However, in such a case, the criteria for determining the assessment value for registering and deleting the keywords differ from those of the extraction dictionary. To be more specific, in the determination processing of the assessment value during the operation of creating the dictionary database 102 (step S104), as shown in FIG. 8, it is necessary for the keywords registered as the dictionary to have assessment values smaller than the threshold value C, or in other words, it is necessary for the idf(t)<C. In the same manner, in the determination processing of the derivative value at the time of registering a keyword during the operation of updating the dictionary database 102 (step S406), as shown in FIG. 9, derivative value<D is a condition for determination; in the determination processing of the derivative value at the time of deleting a keyword (step S409), derivative value>D' is the condition for determination.

In addition, in the present embodiment, the keyword assessment value calculation unit 12 calculates the derivative value between assessment value at the time of the previous processing and the assessment value calculated presently, but, for example, a differential value between the assessment value at the time of the previous processing of the last time and assessment value calculated presently may also be calculated.

In addition, in the present embodiment, an example in which the idf value is used as the assessment value of the keyword is described; however, anything can be used as the assessment value as long as it is an indicator that shows a weight, idiosyncrasy, appearance frequency, and the like of the keyword within the text information group. However, it is necessary to appropriately set the determination conditions for registration and updating in the dictionary database 102 in accordance with a fluctuation trend (monotonic increase, monotonic decrease) of the assessment value that is employed.

Figure 11:
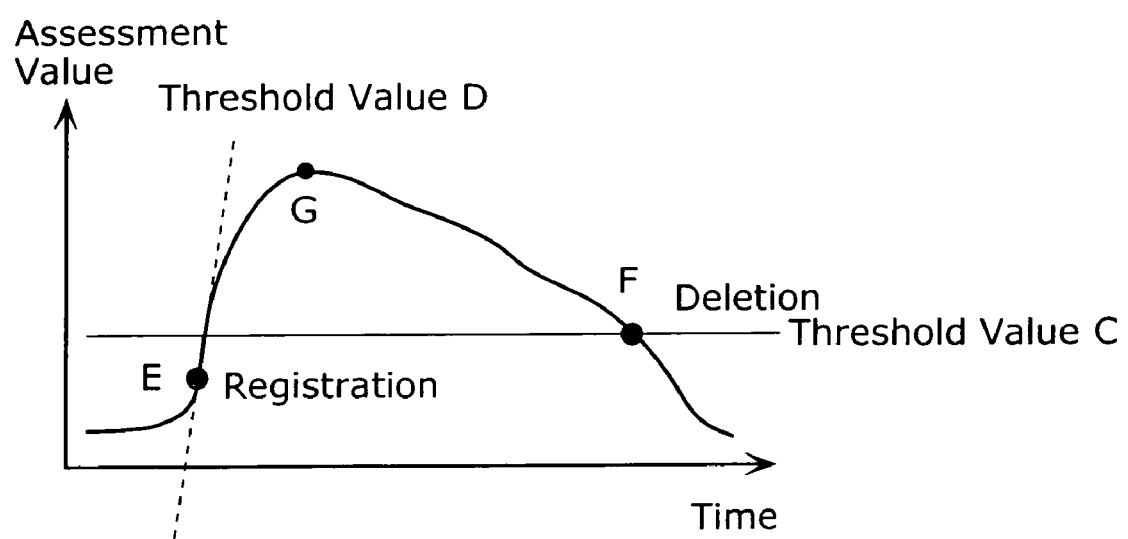
FIG. 11 is a diagram showing an example of a change, over time, of an assessment value of a keyword in the second embodiment of the present invention.

Or, the first embodiment and second embodiment may be combined, registering/deleting the keyword in/from the dictionary taking into consideration both the assessment value of the keyword and the amount of change in the assessment value of the keyword. FIG. 11 is a diagram showing an example of a change, over time, of an assessment value of a keyword. In FIG. 11, the assessment value gradually increases, and at a point E, the derivative value of the assessment value exceeds the threshold value D, and thus is registered in the dictionary database 102. At this time, the absolute value of the assessment value does not reach the threshold value C, but because the assessment value suddenly increases, and the derivative value of the assessment value exceeds the threshold value D, registration in the dictionary database 102 is performed. After that, the assessment value continues to increase, but begins to decrease at a point G, and at a point F, the derivative value of the assessment value drops below the threshold value C. Therefore, this keyword is deleted from the dictionary database 102 at the point F. At this time, the assessment value decreases gradually from the point G to the point F, and does not reach the deletion threshold value D' through the derivative value of the assessment value, as shown in FIG. 10. However, although this is a gradual decrease, the absolute value of the assessment value decreases sufficiently as time goes on; thus the absolute value of the assessment value drops below the threshold value C, and deletion from the dictionary database 102 is carried out. In such a manner, by considering both the absolute value and the derivative value of the keyword assessment value, a more rational judgment for keyword registration/deletion is possible.

In addition, for example, depending on which topic (for example, a genre, a general statement, and so on) of the text information group includes the keyword, it does not matter whether the absolute value of the keyword assessment value or the derivative value of the keyword assessment value is used for determining keyword registration/deletion. Through this, an effective determination of keyword registration/deletion is possible.

In the abovementioned example a combination of the absolute value and derivative value of the keyword assessment value is used, but the combination is not limited to this; an arbitrary combination is also acceptable as long as it is an indicator related to the weight of the keywords.

Third Embodiment

Incidentally, in the handled text information, there are cases where a category classification is provided based on content (for example, a genre name is given for individual units of text information); for example, if this is EPG data, genre names, such as "drama," "movies," and "sports" are given depending on the content of a TV program.

Regarding dependency on this category classification, the keyword "starring" is described as an example. Here, there are 5000 units of EPG data in all, and the number or TV programs in which "starring" appears is 50. On the other hand, of the 5000 units of EPG data, 60 of these have a genre of "movies," and 45 of those include the keyword "starring."

In such a case, the keyword "starring" is not prevalent in the EPG data as a whole, but most of those keywords appear in TV programs that are of the genre "movies." In addition, choosing a program which has the keyword "starring" is approximately equivalent in choosing the genre "movies." Furthermore, it can be said that the keyword "starring" in an EPG data group of the genre "movies" is a keyword with almost no characteristics.

Accordingly, in the present invention, the case described is that in which a dictionary is created with consideration given to a dependency on a category classification when the category classification is given to text information that will be handled based on content.

A configuration in the present embodiment is identical to that of the first embodiment, and therefore descriptions are given using FIG. 1; descriptions of parts identical to those in the first embodiment are omitted.

In the present embodiment, operations performed by a keyword statistics unit 2, a keyword assessment value calculation unit 3, and a determination unit 4 differ from those of the first embodiment.

The keyword statistics unit 2 finds a total number of units of text information in an inputted text information group, a number of units of text information that include an extracted keyword, a total number of units of text information in a category belonging to the units of text information that include the extracted keyword, and statistics related to the appearance of the extracted keyword, such as the number of units of text information that include the extracted keyword belonging to the category.

The keyword assessment value calculation unit 3 calculates an assessment value of the extracted keyword based on the statistics regarding appearances of the keyword found by the keyword statistics unit 2. In the first embodiment, the keyword assessment value calculation unit 3 calculates, as an assessment value of the keyword, an indicator of how the keyword functions in the entire inputted text information group, from the standpoint of weight, idiosyncrasy, appearance frequency, and so on. The idf value is one example. On the other hand, in the present embodiment, the keyword assessment value calculation unit 3 calculates the assessment value using the following formula (2), in order to provide an assessment value with low dependence on the category classification (genre) of the text information group.

Assessment value=[assessment value within the entire text information group]/[category dependency degree] (Formula 2)

The idf value defined by the formula (1) is used in the present embodiment as the [assessment value within the entire text information group].

In addition, the idf value is found for each category within the text information group, and the reciprocal of those minimum values is used as the [category dependency degree].

The idf value of each category is calculated with the following formula (3).

$$idf_j(t) = \log\left(\frac{N_j}{n_j(t)}\right) + 1$$ (Formula 3)

$$N = \sum_j N_j$$ (Formula 4)

Here, in a certain category j, a total number of units of text information belonging to the category j is Nj, and a number of units of text information that include a keyword t is nj(t). However, there are cases where nj(t) is 0, and thus at such times the idfj(t) is not calculated. In addition, a relationship between a total number N of units of text information included in the text information group and the total number Nj of units of text information belonging to the category j is shown in formula (4).

Using the following formula (5), the category dependency degree f(t) is calculated from the found idfj(t), which is the idf value of each keyword t in the category j.

$$f(t) = \frac{1}{\min(idf_j(t))}$$ (Formula 5)

The determination unit 4 determines whether or not to register the keyword in the dictionary database 102 or whether or not to delete the keyword from the dictionary database 102 based on the assessment value calculated by the abovementioned keyword assessment value calculation unit 3.

As described above, the assessment value with a low dependence on the category classification provided in advance is calculated, and thus it is possible to reduce the effect of dependence on the category classification of the text information for keywords that are to be registered in the dictionary database 102.

Note that in the present embodiment, the example using f(t) as defined by the formula (4) as the category dependency degree is described; however, this is not intended to limit the embodiment. For example, finding the idf value of each category according to the formula (3) and finding a variance of those idf values is another example.

Fourth Embodiment

Figure 12:
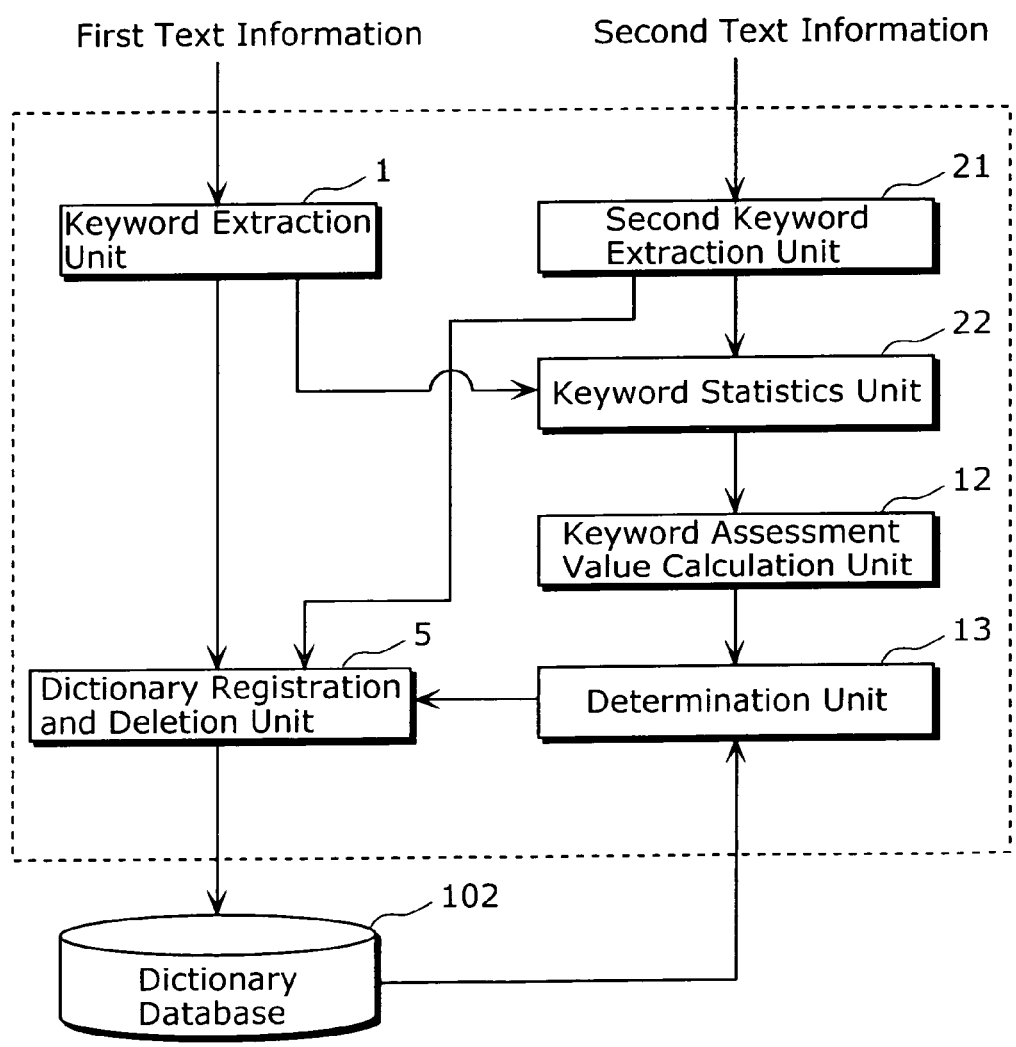
FIG. 12 is a block diagram showing a configuration of a dictionary creation device according to the fourth embodiment of the present invention.

FIG. 12 is a block diagram showing a configuration of a dictionary creation device according to the fourth embodiment of the present invention. Note that parts identical to those of the first embodiment are given identical numbers, and descriptions are omitted.

In a dictionary updating unit 401 of a dictionary creation device 400, a second keyword extraction unit 21 is added to the configuration of the dictionary updating unit 101 of the first embodiment. Two kinds of text information groups (first text information, second text information) are inputted into the dictionary updating unit 401; the first text information is inputted into a keyword extraction unit 1, and the second text information is inputted into the second keyword extraction unit 21.

The second keyword extraction unit 21 extracts a keyword from inputted text information in the same manner as the keyword extraction unit 1. A keyword statistics unit 22 finds, as statistics regarding appearances of a keyword, an overall number of units of text information in the inputted text information group and a number of units of text information that include the extracted keyword for each of the first text information and the second text information.

Next, an example in which the dictionary creation device 400 configured as above is incorporated into an EPG TV program search system is described.

Figure 13:
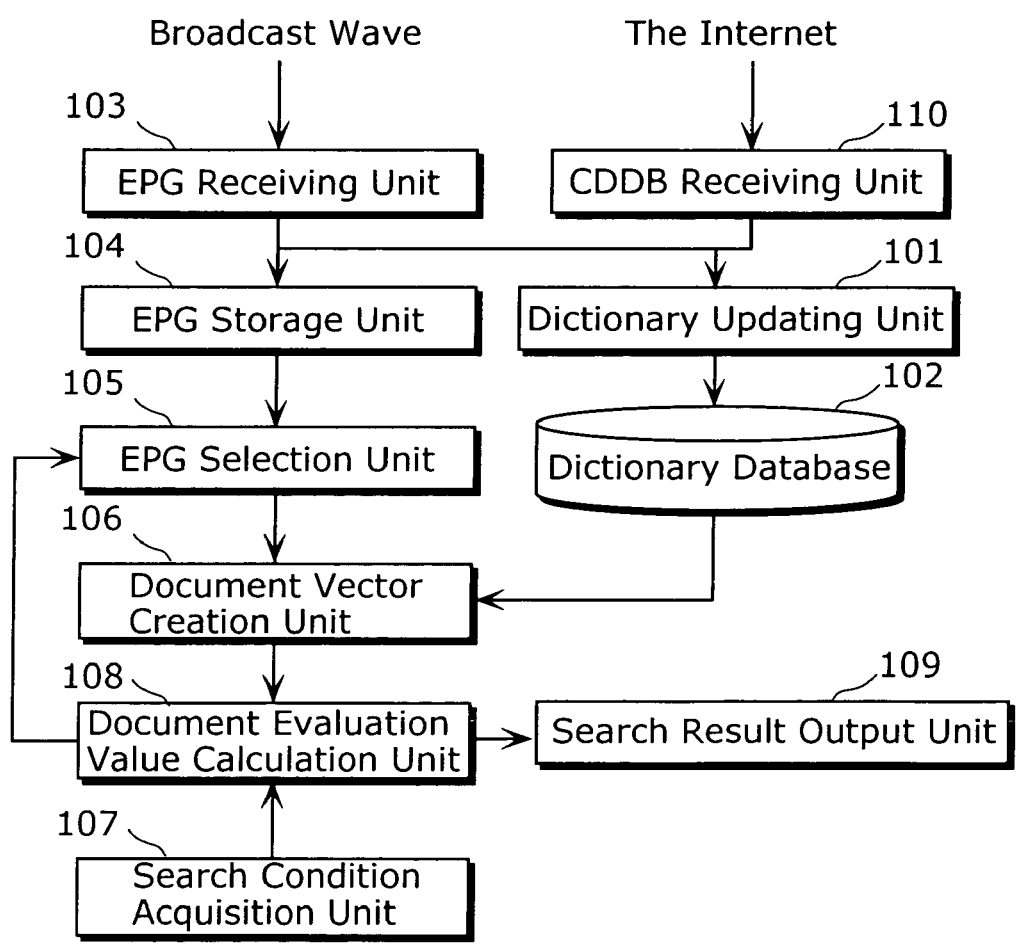
FIG. 13 is a block diagram showing a configuration of an EPG TV program search system included in the dictionary creation device according to the fourth embodiment of the present invention.

FIG. 13 is a block diagram showing a configuration of an EPG TV program search system included in the dictionary creation device according to the fourth embodiment of the present invention. Note that parts identical to those of the first embodiment are given identical numbers, and descriptions are omitted.

In this EPG TV program search system, a CDDB receiving unit 110 is added to the configuration of the EPG TV program search system in the first embodiment. This CDDB receiving unit 110 receives CDDB information, which is information regarding a released CD, via the Internet.

In this EPG TV program search system, EPG data and the CDDB information, which is information about a released CD, are inputted to the dictionary updating unit 101. In other words, in keywords that make up the dictionary database 102, there are keywords which appear in the EPG data, and keywords which appear in the CDDB information.

The CDDB information is information about a CD and music, or more specifically, is quickly-disclosed information regarding a latest album, artist name, and the like. By constructing the dictionary database 102 using this information, it is possible to reflect the latest trends in music information.

On the other hand, the dictionary database 102 is used for searching and classifying TV programs from the EPG data, but because the CDDB information is used to register keywords, it is possible to provide an appropriate document vector even if a TV program is a show about the latest music that has not appeared very much in the EPG data, and thus it is possible to implement an EPG search that is well-suited to music TV programs.

As described above, by constructing the dictionary database 102 from different kinds of information sources, it is possible to supplement keywords that tend to be lacking in a single information source, and quickly reflect the latest trends.

Fifth Embodiment

Incidentally, each classification (category) and a characteristic keyword included in that classification are written in a classification dictionary used to classify TV program information in an EPG TV program search system, such as in, for example, FIG. 17, where "movies," "Hollywood movies", "Japanese movies," and the like are written for a classification "movies." Conventionally, a display format of a TV program chart is changed, content of the TV program chart is classified, and so on, using classification information of the classification dictionary preset in this manner.

Figure 18A:
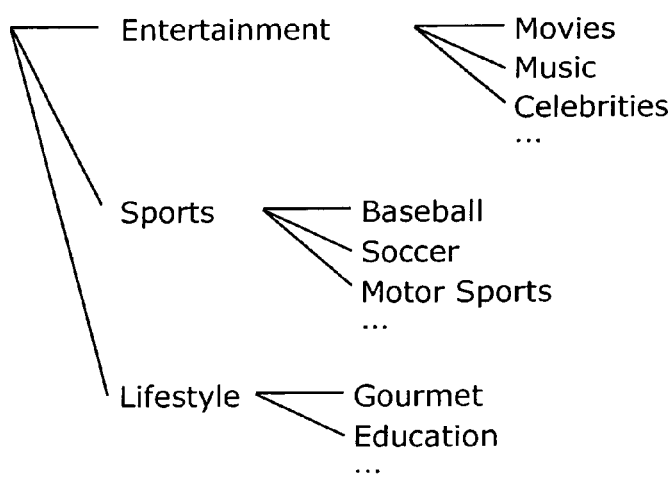
FIGS. 18A and 18B are diagrams showing examples of classifications for each information.
Figure 18B:
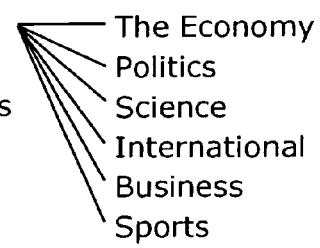

On the other hand, in recent years, there is a service that classifies and accumulates each service, the service being information such as that of a directory service on the Internet, an e-mail newsletter, and an eNewspaper, in an external information server, in order to make it easier for a user to find information s/he needs. Accordingly, for example, addresses of web sites are classified through classifications such as "entertainment," "sports," "lifestyle," and so on, and "entertainment" is further broken down into detailed classifications such as "movies," "music," "celebrities," and so on, as shown in FIG. 18A. For example, an address for information (a web site) about "movies" is accumulated in the classification "movies" in the lowermost level. Using the Internet, the user can acquire the address (URL) of the necessary information by following this classification information. In addition, in the eNewspaper, eNewspaper articles are classified into categories such as "the economy," "politics," "science," and so on, as shown in FIG. 18B, making it easier for the user to search for necessary information.

Accordingly, in the present embodiment, the case described is that in which the classification information of the classification dictionary as shown in FIG. 17 is further updated using the classification information used by other media, as shown in FIG. 18.

Figure 14:
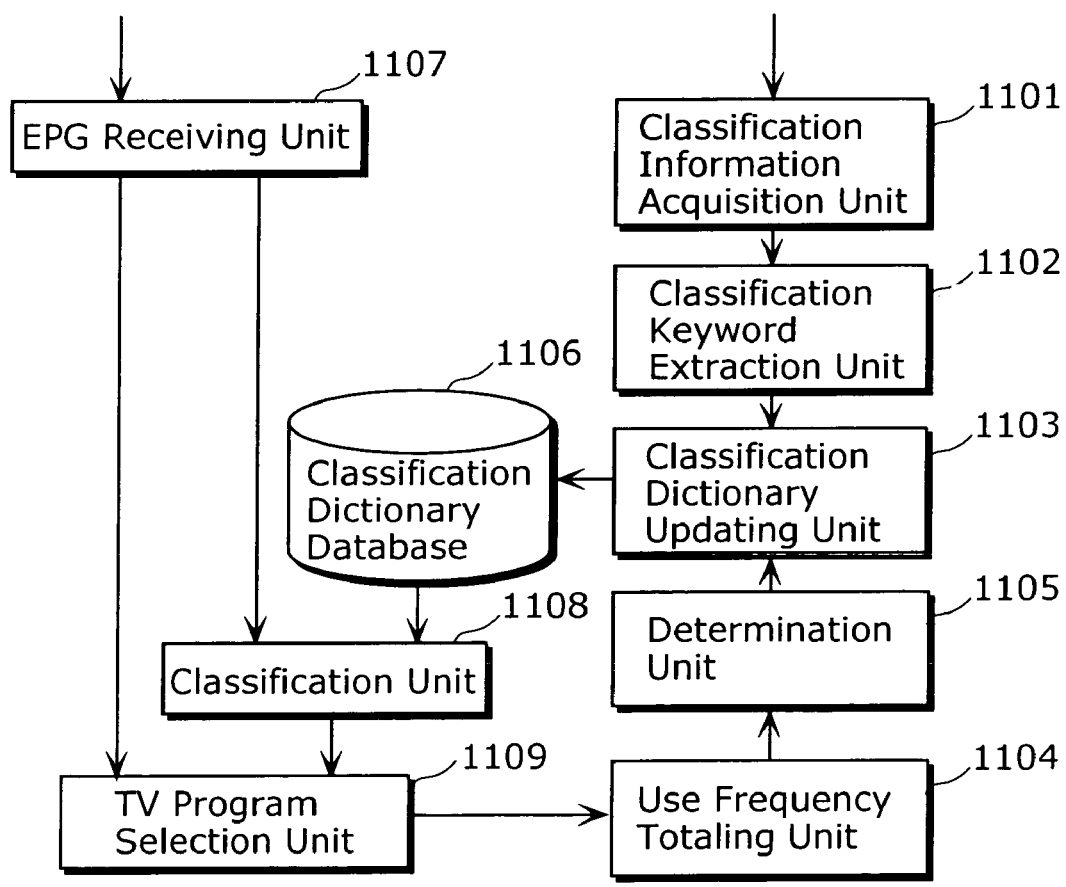
FIG. 14 is a block diagram showing a configuration of an EPG TV program search system according to the fifth embodiment of the present invention.

FIG. 14 is a block diagram showing a configuration of an EPG TV program search system according to the fifth embodiment of the present invention.

This EPG TV program search system 1100 includes: a classification information acquisition unit 1101; a classification keyword extraction unit 1102; a classification dictionary updating unit 1103; a use frequency totaling unit 1104; a determination unit 1105; a classification dictionary database 1106; an EPG receiving unit 1107: a classification unit 1108; and a TV program selection unit 1109.

The classification information acquisition unit 1101 acquires text information of an Internet directory service, an eNewspaper, and the like from an address (URL) of already-classified text information specified by the user. The classification keyword extraction unit 1102 extracts a keyword for classification from the text information acquired by the classification information acquisition unit 1101. The classification dictionary updating unit 1103 updates keywords stored by the classification dictionary database 1106 using the keyword acquired by the classification keyword extraction unit 1102. The use frequency totaling unit 1104 finds a use frequency of a temporary keyword registered in the classification dictionary database 1106. After a predetermined time period passes from when the temporary keyword is registered in the classification dictionary database 1106, the determination unit 1105 determines whether or not to delete the temporary keyword from the classification dictionary database 1106, based on the measured use frequency.

The classification dictionary database 1106 is a database that stores characteristic keywords included in each classification; for example, as shown in FIG. 22, for every "classification," a "constant characteristic keyword," which is a keyword set beforehand, and a "topical characteristic keyword," on which registration and deletion are carried out under a predetermined condition, are registered. The EPG receiving unit 1107 acquires TV program information from a broadcast wave or the Internet. The classification unit 1108 classifies the TV program information acquired by the EPG receiving unit 1107 using a keyword registered in the classification dictionary database 1106. The TV program selection unit 1109 presents the TV program information classified by the classification unit 1108, as well as accepting and selecting the TV program chosen by the user from among the presented TV program information.

Figure 15:
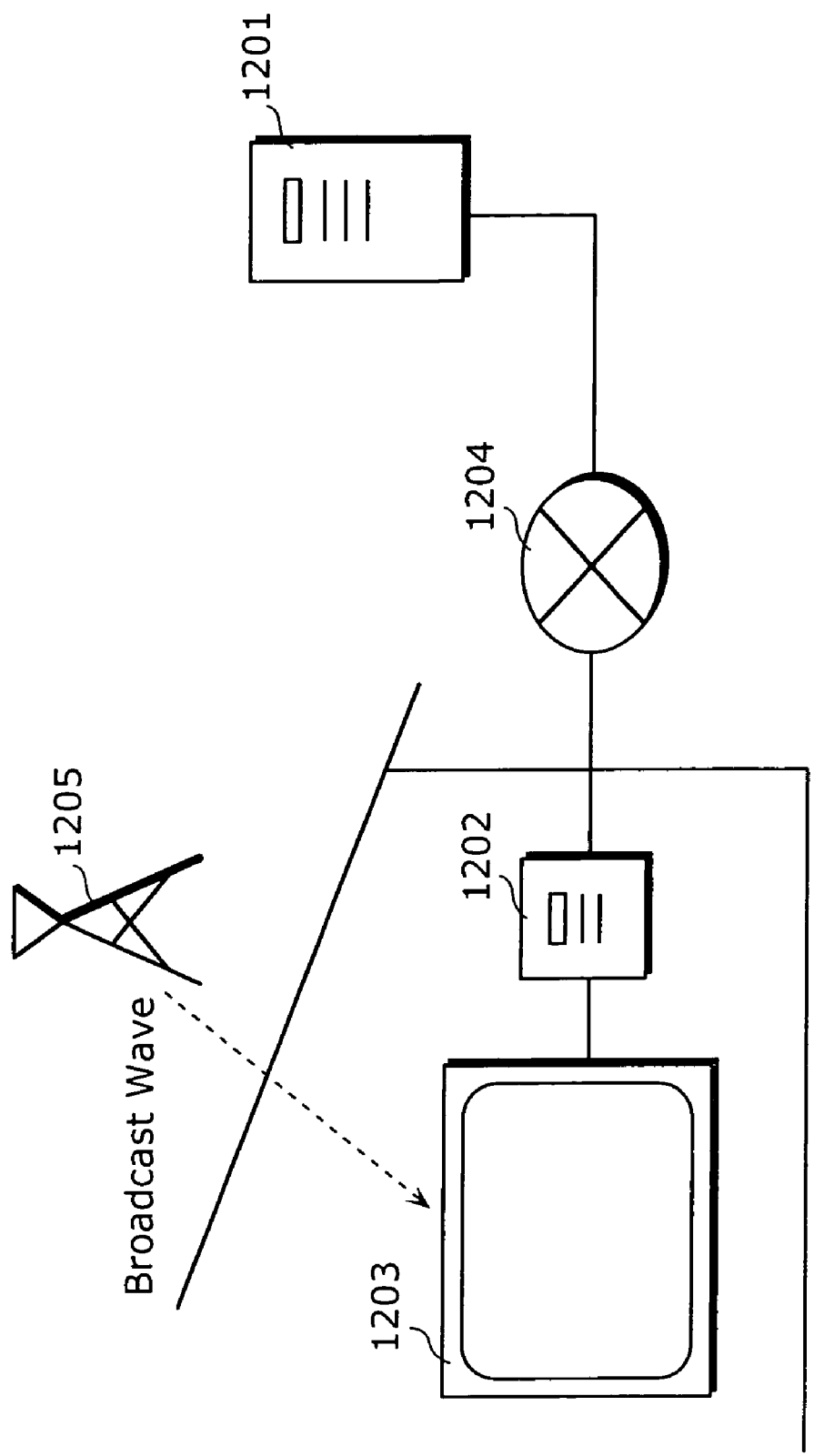
FIG. 15 is a hardware configuration diagram showing an example of a system configuration in the case where an EPG TV program search system according to the fifth embodiment of the present invention is included in a television.

FIG. 15 is a hardware configuration diagram showing an example of a system configuration in the case where an EPG TV program search system is included in a television.

This system includes an external information server 1201 and a television 1203 which is connected to the external information server 1201 via a network 1204, such as the Internet; and a router 1202. The external information server 1201 is connected to the network 1204, and accumulates an article, an address of a web site, and the like for each classification. The router 1202 connects a device within the home to the external network 1204. The television 1203 includes the abovementioned EPG TV program search system, can acquire the TV program information by receiving a broadcast wave outputted from a broadcasting station 1205, and furthermore can access external Internet contents through the router 1202.

Next, an operation of the EPG TV program search system configured as above is described.

Figure 16:
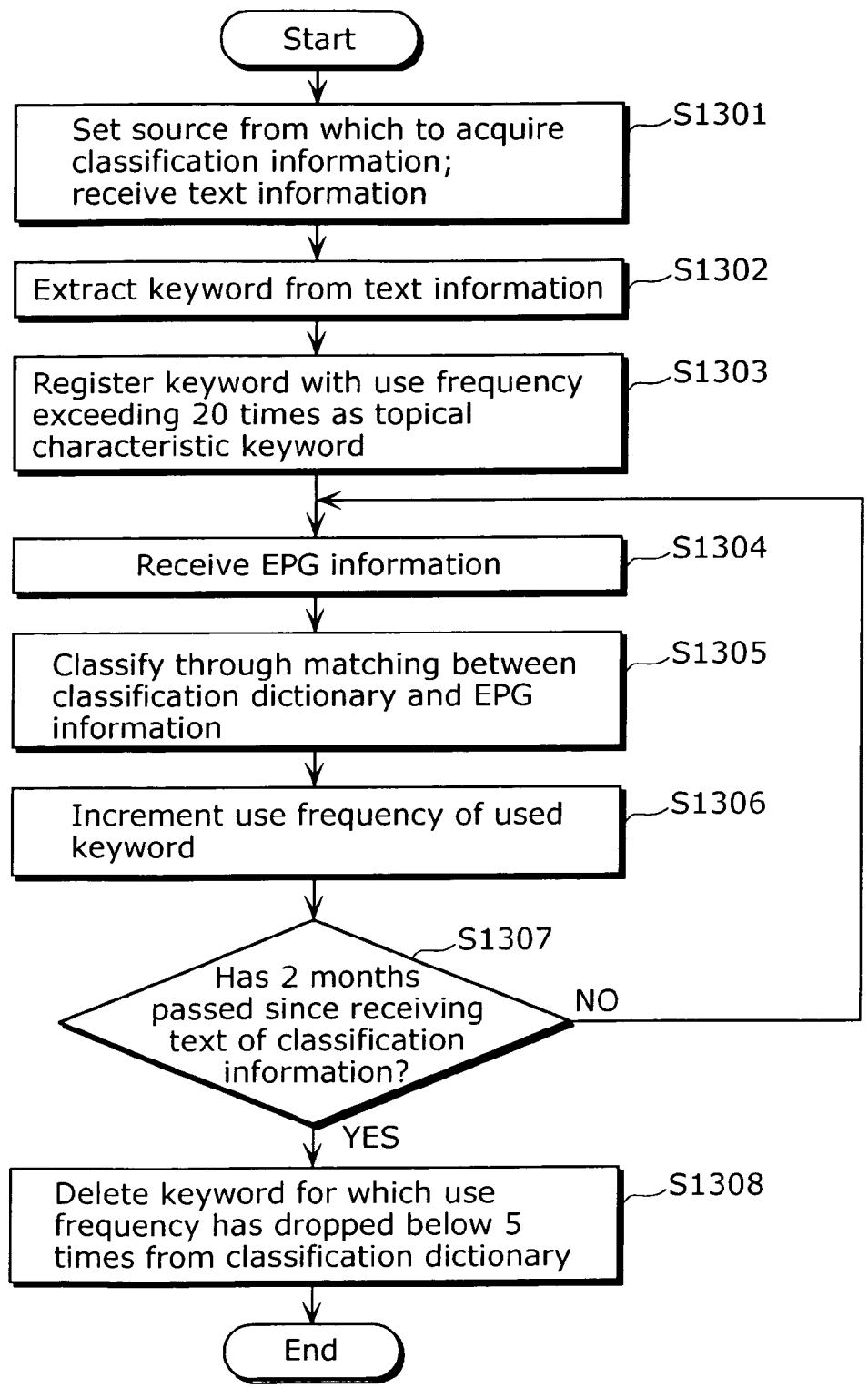
FIG. 16 is a flowchart showing an operational flow when updating a classification dictionary database in an EPG TV program search system according to the fifth embodiment of the present invention.

FIG. 16 is a flowchart showing an operational flow when updating a classification dictionary database 1106 in an EPG TV program search system; an update operation of the classification dictionary database 1106 is described hereafter in accordance with this flowchart.

For example, an item to be classified is selected by the user from a screen which displays items to be classified, such as the TV program chart shown in FIG. 19(a); for example, when an Internet URL, such as shown in FIG. 19(b), is set for the classification "movies," the classification information acquisition unit 1101 acquires, from the set URL, text information about "movies" as shown in, for example, FIG. 20A (step S1301). Because the Internet carries very up-to-date content, in the case of "movies," there are many situations where information and the like is available before a movie is premiered. In addition, for example, it is possible to acquire, through the user's settings, text information related to "music," as shown in FIG. 20B. Note that in the case where it is difficult to input a URL using the television 1203, an interface in which URL candidates are set beforehand and the user chooses from among those candidates may be used. In addition, this URL setting may be performed in advance, when the television 1203 is shipped.

The classification keyword extraction unit 1102 selects a representative keyword from the text information acquired by the classification information acquisition unit 1101 by performing keyword extraction through morphological analysis and character types (step S1302). Here, for example, in the case where the number of times the keyword appears in a predetermined time period (appearance frequency) exceeds a predetermined threshold value (for example, 20 times), that keyword is selected. Note that here, the keyword selection method is not limited to this; it is also possible to use statistical information, as mentioned in the first embodiment.

FIG. 21 is a diagram showing an example of a result of extracting a characteristic keyword for "movies" and "music." The keywords extracted here are characteristic in that proper nouns are abundant. There are many cases where these keywords are not included in the constant keywords registered in the classification dictionary database 1106 in advance, as shown in FIG. 17. Accordingly, the classification dictionary updating unit 1103 registers the keywords not included in the constant keywords in the classification dictionary database 1106 as topical characteristic keywords, as shown in FIG. 22 (step S1303).

The EPG receiving unit 1107 acquires the EPG information about a TV program from the broadcast wave or the Internet, as shown in, for example, FIG. 24 (step S1304). By checking whether or not the keyword registered in the classification dictionary database 1106 is included in the text information acquired as the EPG information, the TV program selection unit 1109 finds which classification the TV program, the EPG information of which has been acquired, falls under (step S1305). For example, in the case of the TV program example shown in FIG. 24, the words "Metrix" and "Kianu" match with topical characteristic keywords of the classification "movies" in the classification dictionary database 1106. Therefore, the TV program selection unit 1109 judges that a TV program "Atsushi's Trend Info" is a TV program about movies. At this time, it is impossible to judge the information as being information about "movies" based on the constant characteristic keywords, as shown in FIG. 17; however, because the topical characteristic keywords, as shown in FIG. 22, are extracted, it is possible to judge that the TV program is about "movies."

In the case where the topical characteristic keyword of the classification dictionary database 1106 is included in the text information acquired as the EPG information, the use frequency totaling unit 1104 causes a use frequency count for the topical characteristic keyword to increase (step S1306). In the above example, the use frequency totaling unit 1104 increases the use frequency of the keywords "Metrix" and "Kianu" by 1.

The determination unit 1105 determines whether or not the predetermined time period (for example, two months) has passed since acquiring the text information that is the basis of the topical characteristic keywords, or in other words, since the temporary keywords were registered in the classification dictionary database 1106 (step S1307). Here, in the case where the predetermined time period has not passed (NO of step S1307), the EPG information is further acquired, and the use frequency totaling unit 1104 totals the use frequency of the topical characteristic keywords (step S1304 to S1306). In other words, the topical characteristic keyword is held in the classification dictionary database 1106 until the predetermined time period passes. Note that here, it is determined whether or not the predetermined time period has passed; however, the determination unit 1105 may determine, for example, whether or not the number of units of EPG data acquired has reached a predetermined number, may determine whether or not the number of registered topical characteristic keywords has reached a predetermined number, and so on.

On the other hand, in the case where the predetermined time period has passed (YES of S1307), the determination unit 1105 determines to delete, from the classification dictionary database 1106, the topical characteristic keywords that have dropped below a lower threshold limit for deletion, that lower threshold limit being set in advance by the totaled use frequency. The classification dictionary updating unit 1103 deletes, from classification dictionary database 1106, the topical characteristic keywords determined to be deleted (step S1308).

Figure 25:
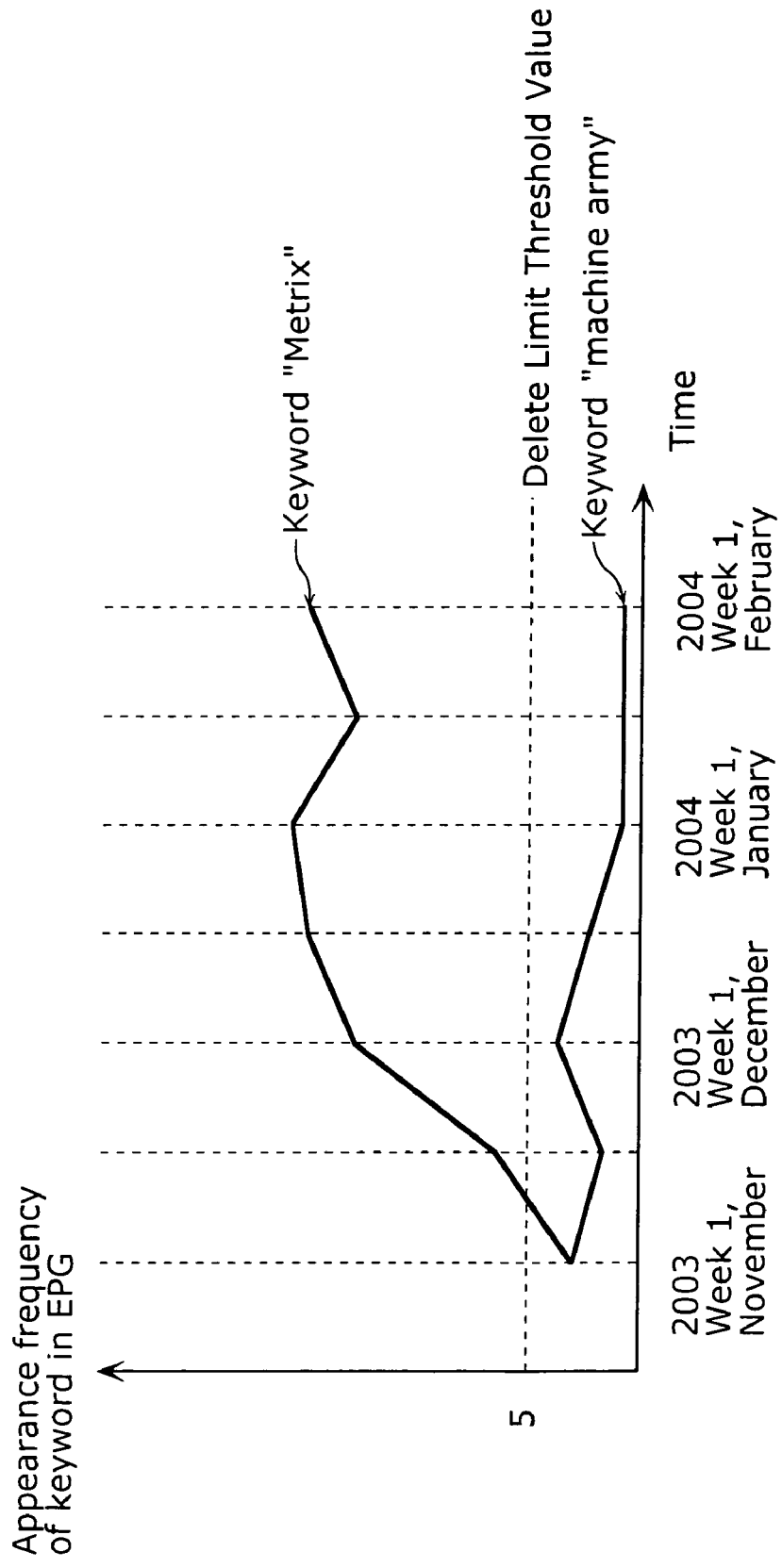
FIG. 25 is a diagram showing an example of a use frequency per period of a topical characteristic keyword.

FIG. 25 is a diagram showing an example of a use frequency per period of a topical characteristic keyword. In FIG. 25, after being acquired from the text information of a set URL and set as a topical characteristic keyword, the keyword "Metrix" appears frequently in the EPG information, and therefore the appearance frequency number of the keyword increases. On the other hand, because a keyword "machine army" extracted at the same time is not often used as the EPG information, the appearance frequency number of the keyword is low. In this example, the keyword "Metrix" exceeds the preset lower threshold limit for deletion of 5, and therefore remains registered as a topical characteristic keyword for the classification "movies." On the other hand, the keyword "machine army" drops below the preset lower threshold limit for deletion of 5, and therefore is deleted from among the topical characteristic keywords for the classification "movies."

Figure 23:
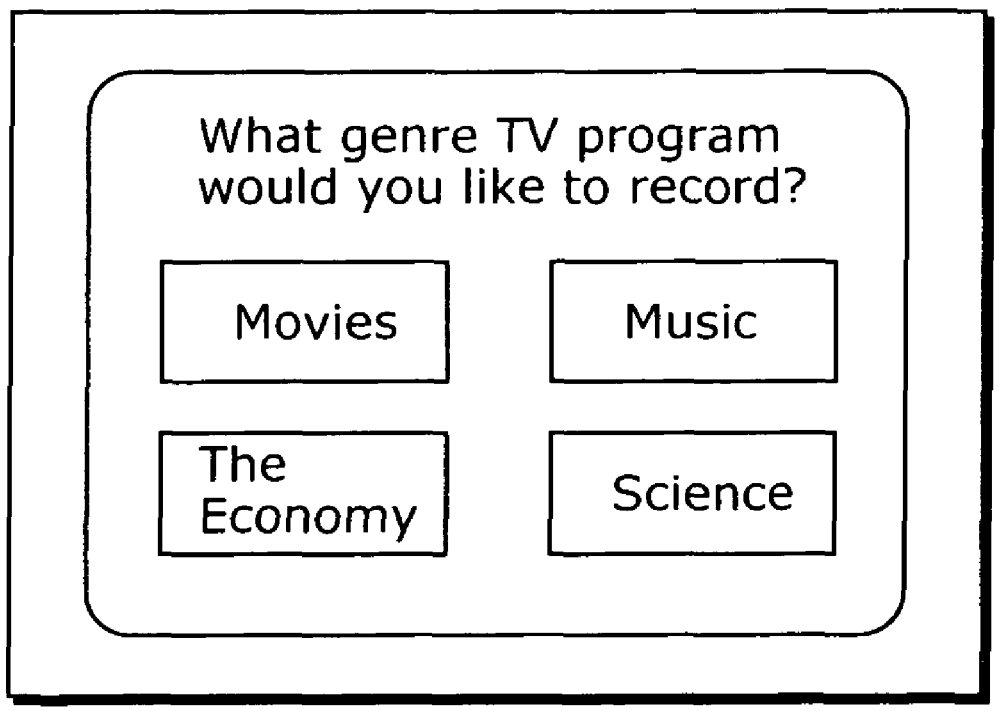
FIG. 23 is a diagram showing an example of a screen when a classification for a recording setting is selected by a user.

Through the abovementioned processing, when a TV program is classified, by acquiring a topical characteristic keyword, such as a proper noun, from media such as the Internet and an eNewspaper, and registering this as the topical characteristic keyword in the classification dictionary database 1106, while at the same time using the constant characteristic keyword, it is possible to create a classification dictionary database 1106 that corresponds to changes in the times. Furthermore, by using the classification dictionary database 1106 created in this manner, it is possible to realize highly-accurate classification of TV programs. In addition, using this classification dictionary database 1106, it is possible to set a TV program desired by the user to be recorded from the EPG data, simply by the user selecting a classification, as shown in FIG. 23.

Note that in the present embodiment, the constant characteristic keywords for classification are registered in the classification dictionary database 1106 in advance, as shown in FIG. 17; however, these keywords may be constructed automatically from a media aside from the EPG, such as the Internet, an eNewspaper, and the like.

Sixth Embodiment

Incidentally, classified electronic text information, such as classifications including a directory service on the Internet, an eNewspaper, and the like, are often used by a user. There are cases where the user uses a classification pattern s/he prefers, and classifies distributed information, information s/he must manage her/himself, and the like.

These units of classified information differ with each service company, and also differ between service companies that carry out the same Internet classification services. In addition, the units of classified information also differ between service companies for newspapers, e-mail newsletters, and the like. Also, in regards to distribution of electronic programming for TV programs, the TV programs are classified with classification information such as "movies," "drama," and the like provided by a broadcast station. However, there are many cases where the TV programs classified by the broadcast station are not classifications which the user normally uses. Similarly, in regards to TV program information, there are situations where the TV program is classified using tag information given to the TV program by the broadcast station. However, there are cases where the classifications which the user normally uses are different.

For example, when news regarding "stock prices" is televised, the TV program belongs to a classification "news" based on the classification of the TV program information, but when using classification information from the Internet, there are cases where this TV program is classified in a category "the economy." For a user who regularly uses the classification information from the Internet, there are cases where, for example, when accumulating a moving picture, the user may wish to assign the TV program to the classification of "the economy" even if the TV program information for a news program is classified as "stock market."

Accordingly, in the present embodiment, the case described is that in which the TV program information of the EPG is classified using the classification information which is regularly used by the user.

Figure 26:
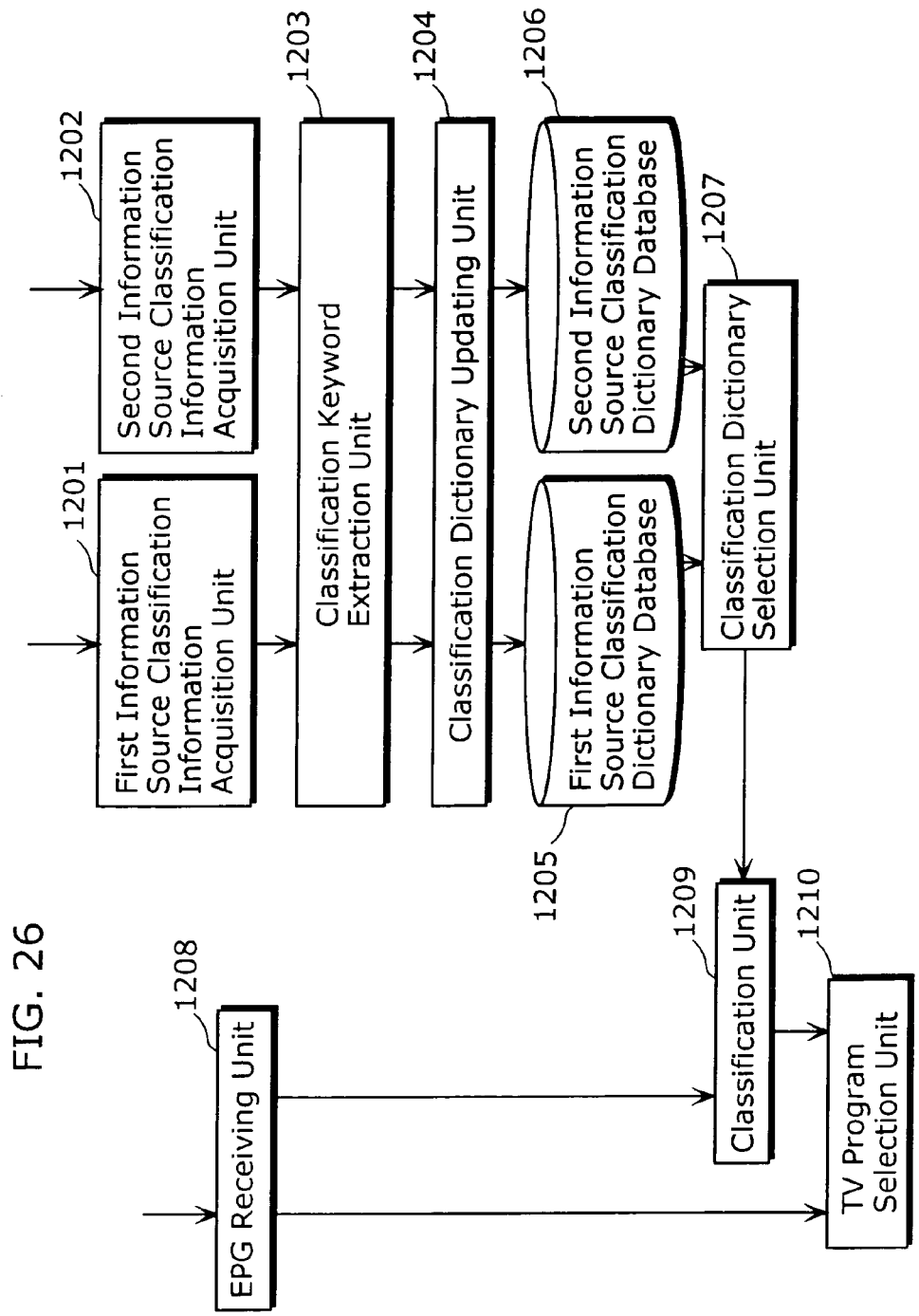
FIG. 26 is a block diagram showing a configuration of an EPG TV program search system according to the sixth embodiment of the present invention.

FIG. 26 is a block diagram showing a configuration of an EPG TV program search system according to the sixth embodiment of the present invention. Note that a hardware configuration of present embodiment is identical to the hardware configuration shown in FIG. 15 in the fifth embodiment, and therefore descriptions are omitted. This EPG TV program search system 1200 includes: a first information source classification information acquisition unit 1201; a second information source classification information acquisition unit 1202; a classification keyword extraction unit 1203; a classification dictionary updating unit 1204; a first information source classification dictionary database 1205; a second information source classification dictionary database 1206; a classification dictionary selection unit 1207; an EPG receiving unit 1208; a classification unit 1209; and a TV program selection unit 1210.

The first information source classification information acquisition unit 1201 acquires classification information from a first information source specified by the user, and acquires text information from an address (URL) of text information classified by this classification information. The second information source classification information acquisition unit 1202, acquires classification information from a second information source, which is different from the first information source, as specified by the user, and acquires text information from an address (URL) of text information classified by this classification information. The classification keyword extraction unit 1203 extracts respective keywords for classification from the text information acquired from the first information source classification information acquisition unit 1201 and the second information source classification information acquisition unit 1202.

The classification dictionary updating unit 1204 registers the units of classification information acquired from the first information source and the second information source in the first information source classification dictionary database 1205 and the second information source classification dictionary database 1206 respectively. Furthermore, the classification dictionary updating unit 1204 associates the keyword extracted by the classification keyword extraction unit 1203 with the units of classification information acquired from the first information source and the second information source and registers these units of classification information in the first information source classification dictionary database 1205 and the second information source classification dictionary database 1206.

Figure 28A:
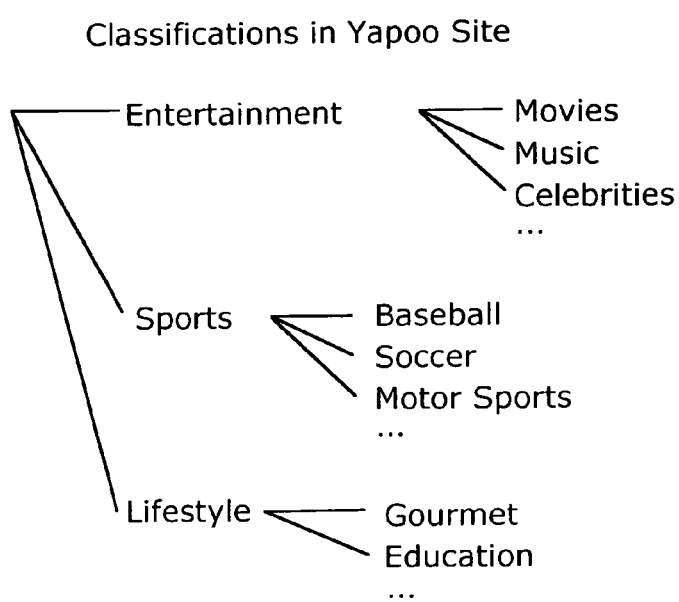
FIGS. 28A and 28B are diagrams showing "classifications" of a classification dictionary database; 28A is an example of a case based on classification information acquired from a first information source, 28B is an example of a case based on classification information acquired from a second information source, and 28C is an example of a case based on classification information acquired from a third information source.
Figure 28B:

The first information source classification dictionary database 1205 is a database that stores the keywords extracted from the text information per "classification" (including a sub-classification, which further divides up a classification) based on the classification information acquired from the first information source, as shown in FIG. 28A. The second information source classification dictionary database 1206 is a database that stores the keywords extracted from the text information per "classification" based on the classification information acquired from the second information source, as shown in FIG. 28B. Note that in FIG. 28, descriptions about the keywords included in the classification (sub-classification) are omitted.

The classification dictionary selection unit 1207 accepts an instruction from the user, and selects either of the first information source classification dictionary database 1205 and the second information source classification dictionary database 1206 as a classification dictionary database used to classify the TV program information.

The EPG receiving unit 1208 acquires TV program information from a broadcast wave or the Internet. The classification unit 1209 uses the classification dictionary database selected by the classification dictionary selection unit 1207 and classifies the TV program information acquired by the EPG receiving unit 1208. The TV program selection unit 1210 presents the TV program information classified by the classification unit 1209, as well as accepting and selecting the TV program chosen by the user from among the presented TV program information.

Next, an operation of the EPG TV program search system configured as above is described. Note that in the present embodiment, operations from acquiring already-classified text information to constructing the classification dictionary after extracting the keywords for classification from that text information are almost identical to those described in the fifth embodiments, and therefore descriptions are omitted.

In the present embodiment, the classification dictionary selection unit 1207 uses either of the first information source classification dictionary database 1205, which corresponds to the classification information of the first information source, and the second information source classification dictionary database 1206, which corresponds to the classification information of the second information source, and accepts the instruction of whether or not to perform classification from, for example, the user, as shown in FIG. 27. Then, the classification dictionary selection unit 1207 selects the classification dictionary database to use in the classification, as per the accepted instruction.

As described above, by creating a plurality of classification dictionary databases corresponding to the classification information of a plurality of information sources, it is possible to classify information provided by the EPG using the classification information which the user uses on a daily basis and understands with ease, and thus possible to manage the TV program and the information in a uniform classification.

Figure 27A:
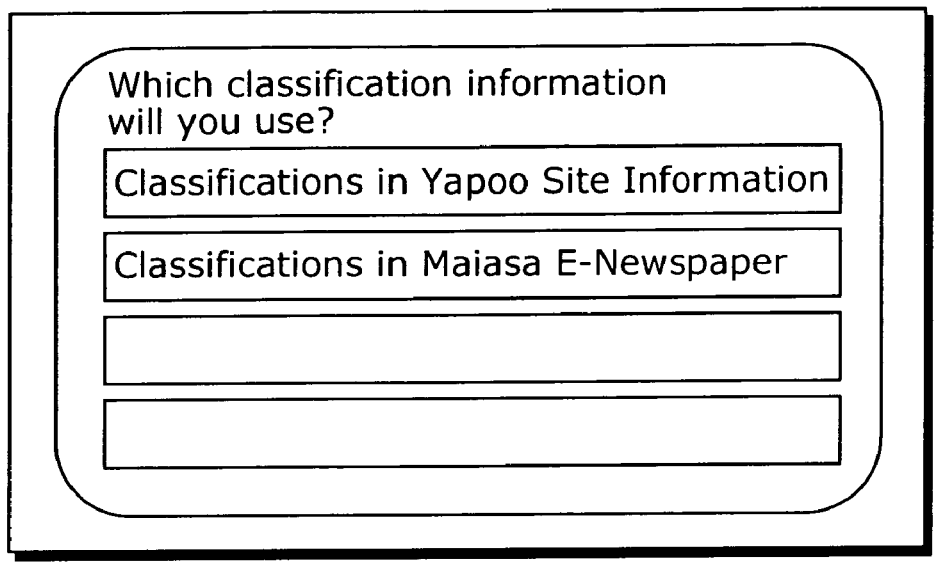
FIGS. 27A and 27B are diagrams showing examples of a screen when a classification dictionary database (information source site) is selected by a user; 27A is an example of the case where there are two information sources, and 27B is an example of the case where there are three information sources.

Note that in the present embodiment, the classification dictionary database (a site of the information source) is selected by the user, as shown in FIG. 27A; however, this is not intended to limit the embodiment, and the classification dictionary selection unit 1207 may select the classification dictionary database. For example, the classification dictionary selection unit 1207 can select the classification dictionary database, the information source of which is a site which already carries out classification similar to the classification information of the EPG, and can also select the classification information database, the information source of which is a site with the highest number of classifications.

In addition, in the present embodiment, classification of the TV program using the text information of the EPG is described, but by the user specifying the classification, it is possible to use the text information of the EPG in implementing an automatic recording function. Therefore, while conventionally it is only possible to set automatic recording with the classification information provided by the broadcast station, it is now possible to automatically record a TV program using the classification information of the site that is used regularly.

Figure 27B:
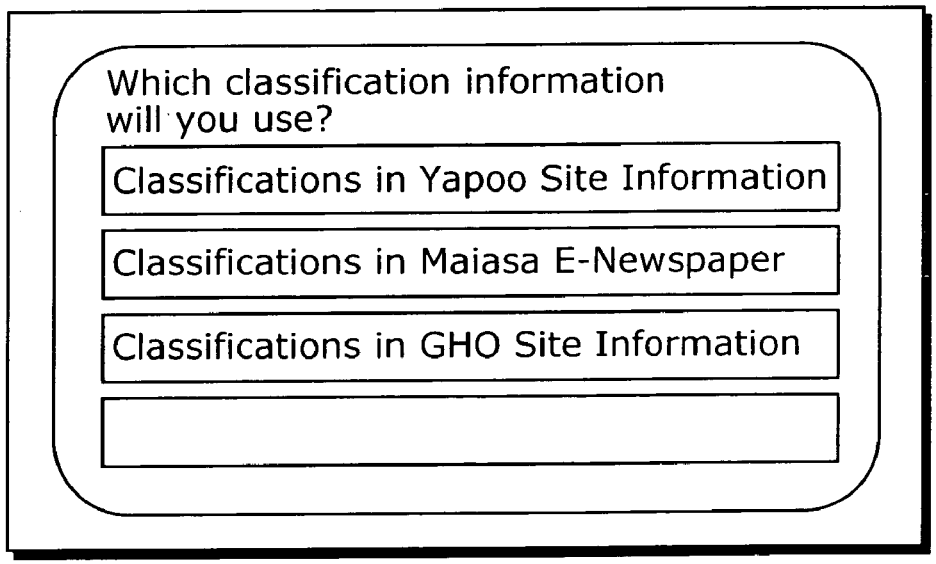
Figure 28C:
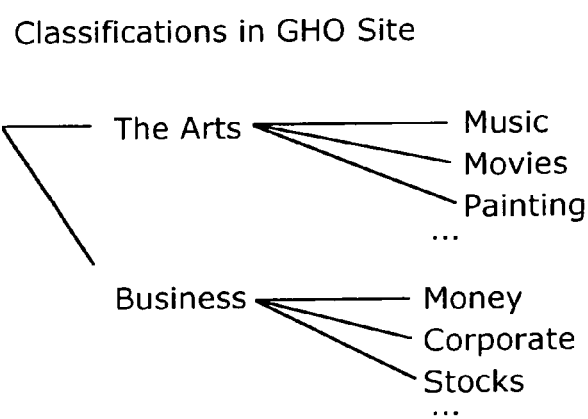

In addition, in the present embodiment, the case where there are two information sources from which the classification information is acquired is described, but this is not intended to limit the embodiment. For example, in the case where there are three information sources, a third information source classification information acquisition unit and a third information source classification dictionary database may be included. In such a case, information as shown in, for example, FIG. 28C is registered in the third information source classification dictionary database, and the classification dictionary database (a site of the information source) is selected by the user from a screen as shown in FIG. 27B. The same is applicable for four or more information sources.

Seventh Embodiment

In regards to classification of information, there are sites which use a specialized classification, and sites which use a general classification, and there are many cases in which classifications are constructed with the respective features of each site. There are situations where a user refers to a suitable classification from among those classifications in accordance with his/her application and classifies information to be managed.

Accordingly, in the present embodiment, the case described is that in which units of information regarding classifications used on the Internet and the like are combined.

Figure 29:
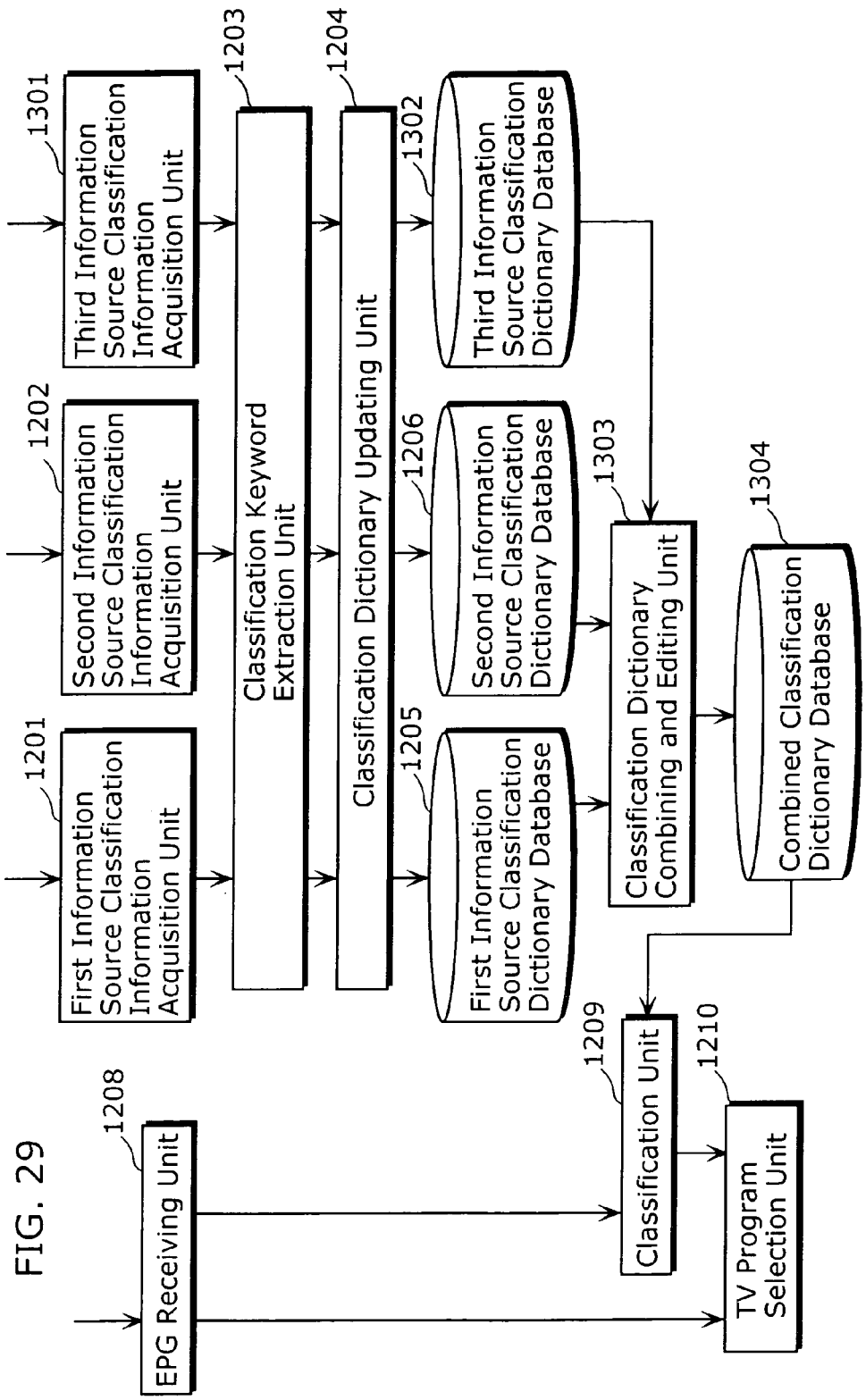
FIG. 29 is a block diagram showing a configuration of an EPG TV program search system according to the seventh embodiment of the present invention.

FIG. 29 is a block diagram showing a configuration of an EPG TV program search system according to the seventh embodiment of the present invention. Note that parts identical to those of the sixth embodiment are given identical numbers, and descriptions are omitted. In addition, a hardware configuration of the present embodiment is identical to the hardware configuration shown in FIG. 15 in the fifth embodiment, and therefore descriptions are omitted. The EPG TV program search system 1300 of the present embodiment includes, in addition to the elements of the sixth embodiment, a third information source classification information acquisition unit 1301, a third information source classification dictionary database 1302, and a combined classification dictionary database 1304, as well as a classification dictionary combining and editing unit 1303 in place of the classification dictionary selection unit 1207 of the sixth embodiment.

Based on classification information stored in the first information source classification dictionary database 1205, classification information stored in the second information source classification dictionary database 1206, and classification information stored in the third information source classification dictionary database 1302, the classification dictionary combining and editing unit 1303 creates a newly edited/combined combined classification dictionary database 1304.

Next, an operation of the EPG TV program search system configured as above is described. Note that a process of constructing each classification dictionary database is identical to that described in the fifth and sixth embodiments, and therefore descriptions are omitted.

Here, a directory A classification, as shown in, for example, FIG. 30A, is constructed in the first information source classification dictionary database 1205; a directory B classification, as shown in, for example, FIG. 30B, is constructed in the second information source classification dictionary database 1206; and a directory C classification, as shown in, for example, FIG. 30C, is constructed in the third information source classification dictionary database 1302. As shown in FIGS. 30A to C, general classification information is used in the directories A and C, but detailed classification information related to sports is used in the directory B.

Because each classification information is expressed by characteristic keywords, the classification dictionary combining and editing unit 1303 assesses a vertical relationship for levels between each classification, and a relationship of equal values (identical meaning) is evaluated through a set of characteristic keywords. To be more specific, for example, classifications P and Q are provided, and the sets of characteristic keywords for the respective classifications are P and Q. At this time, P∩Q expresses an intersecting set of characteristic keywords of the classifications P and Q, while P∪Q expresses a sum-set of the classifications P and Q. Furthermore, |P| expresses a number of elements in a set P, and |P∩Q| expresses a number of elements of a set (P∩Q).

Figure 31A:
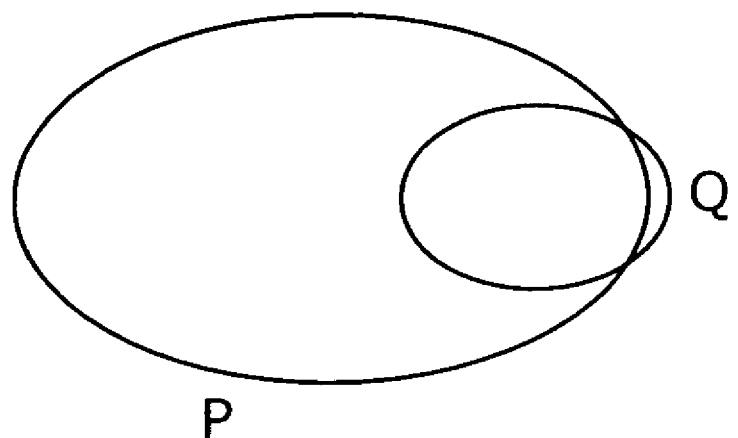
FIGS. 31A and 31B are schematic diagrams showing a set relationship of characteristic keywords included in two classifications; 31A is a case in which most characteristic keywords of one classification are included in the other classification, and 31B is a case in which the characteristic keywords included in the two classifications are almost identical.

Here, when the following formulas (6) and (7) are valid, most of the characteristic keywords of the classification Q are included in the classification P, as shown in FIG. 31A. Accordingly, the classification Q is put in a level below that of the classification P. For example, in the case where the characteristic keyword of the classification "baseball" is included in the characteristic keywords of the classification "sports," the classification "baseball" is put in a level below that of the classification "sports."

$$0.9 \leq \frac{|P \cap Q|}{|Q|} \quad \text{(Formula 6)}$$

$$\frac{|P \cap Q|}{|P|} \leq 0.5 \quad \text{(Formula 7)}$$

$$0.9 \leq \frac{|P \cap Q|}{|P|} \quad \text{(Formula 8)}$$

Figure 31B:
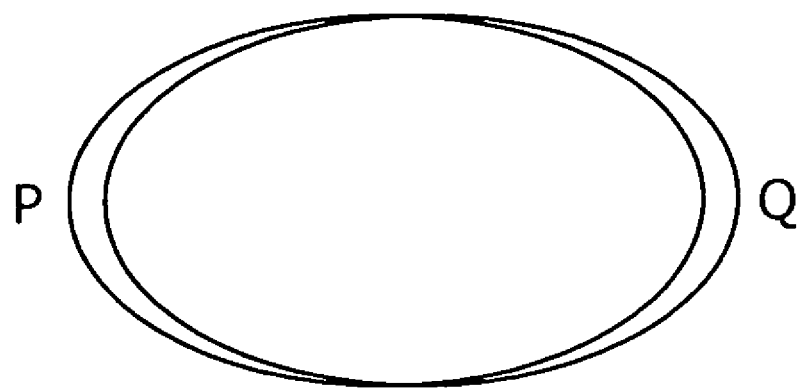

On the other hand, in the case where the formulas (6) and (8) are valid, the characteristic keywords of the classification Q and the characteristic keywords of the classification P tend to be almost identical, as shown in FIG. 31B. In this case, these are treated as classifications expressing the same meaning. For example, in the case where the characteristic keywords for "the economy" in the directory A and for "business" in the directory C are approximately the same, as shown in FIG. 30, these classifications indicate the same thing.

Figure 32:
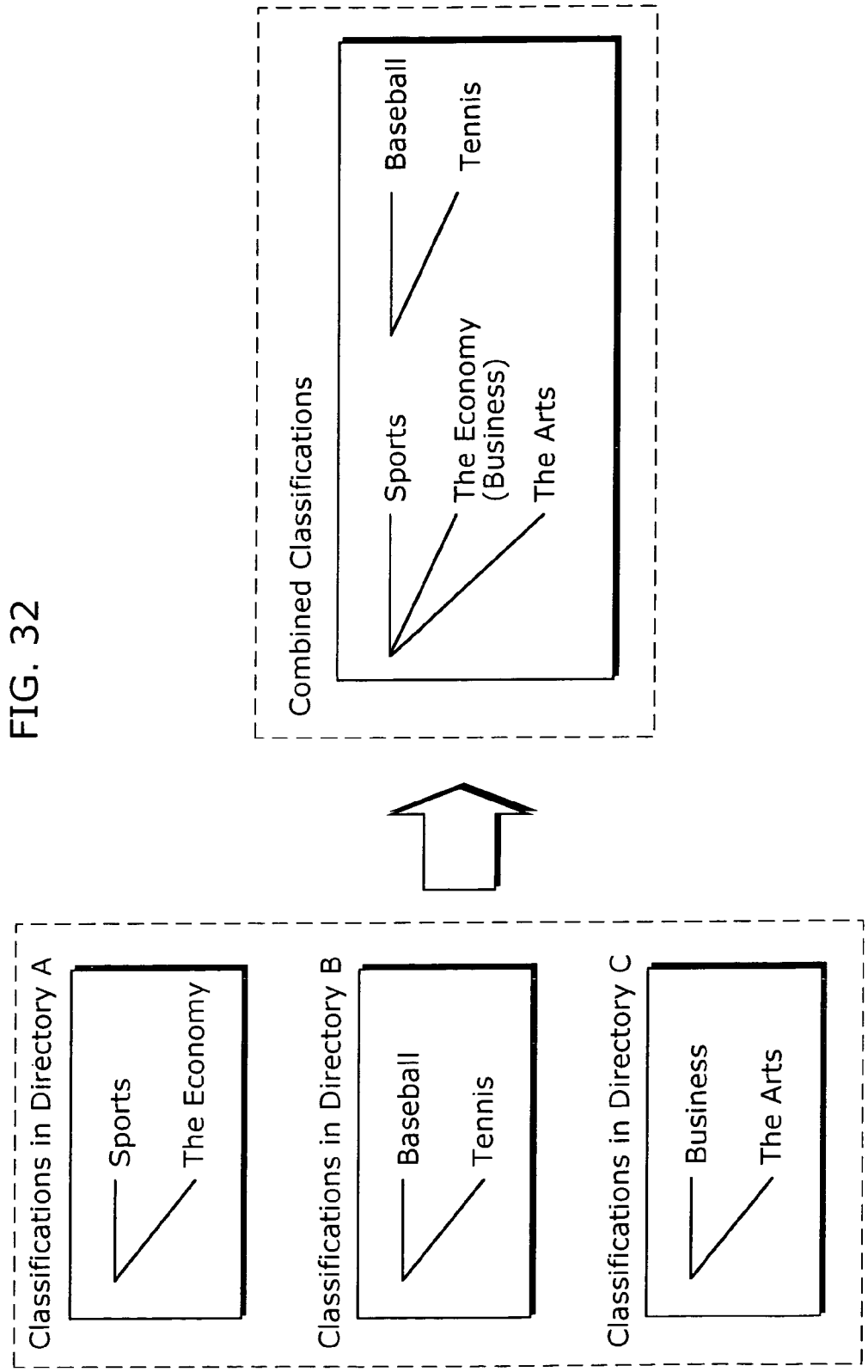
FIG. 32 is a diagram showing an example of a classification when classification information of three classification dictionary databases is combined into one classification dictionary database.

The classification dictionary combining and editing unit 1303 performs the above assessment for each classification dictionary database as shown in FIG. 30, and along with building a level structure, extracts keywords expressing classifications with identical content, and creates a new classification level. As a result, the classification information of the three classification dictionary databases shown in FIG. 32 are collected, and it is possible to construct one classification level.

As described above, the relationship between each classification is evaluated through the sets of characteristic keywords included in each classification, and therefore the classification dictionary database of a new classification level can be constructed, in which the classification information of each classification dictionary database is gathered together; thus, it is possible to classify the TV program chart of the EPG from a new point of view.

Note that in the present embodiment, the case where there are three classification dictionary databases which are combined is described, but this is not intended to limit the embodiment. For example, there may be two classification dictionary databases, or there may be more than 4.

Eighth Embodiment

As described above, information regarding a classification varies from time period to time period. For example, information about popular movies differs depending on a time period, the month, and so on; therefore, in order to extract information about "movies," it is necessary to hold characteristic keywords used for classification per time period. In addition, with information of, for example, professional baseball, a characteristic keyword "manager Hoshino" is found in information about the team "Hanshin" after the year 2000, but is found in information about the team "Chunichi" in the 1990s; in such a manner, the characteristic keywords differ depending on the time period.

Accordingly, in the present embodiment, the case described is that in which, when the characteristic keyword is registered, time information of that keyword is also registered.

Figure 33:
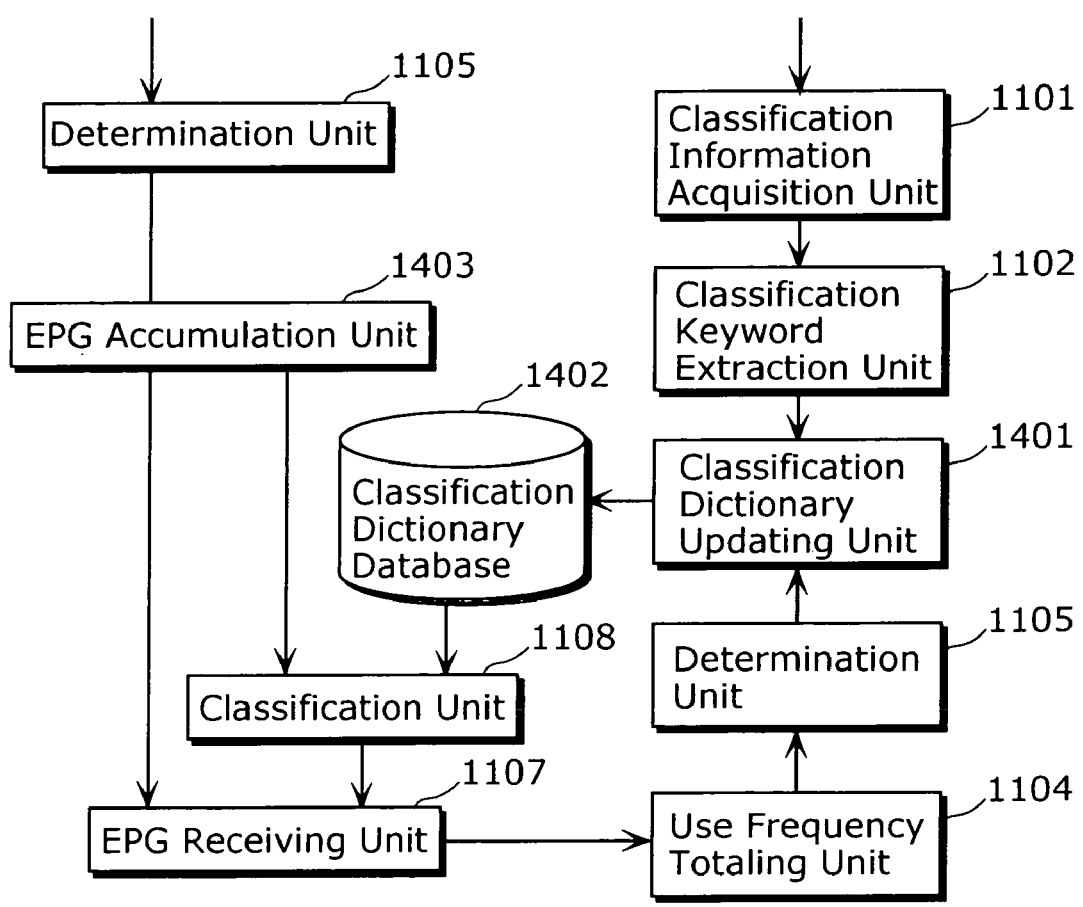
FIG. 33 is a block diagram showing a configuration of an EPG TV program search system according to the eighth embodiment of the present invention.

FIG. 33 is a block diagram showing a configuration of an EPG TV program search system according to the eighth embodiment of the present invention. Note that parts identical to those of the fifth embodiment are given identical numbers, and descriptions are omitted. In addition, a hardware configuration of the present embodiment is identical to the hardware configuration shown in FIG. 15 in the fifth embodiment, and therefore descriptions are omitted. An EPG TV program search system 1400 includes an EPG accumulation unit 1403 in addition to the configuration shown in the fifth embodiment. In addition, an operation of a classification dictionary updating unit 1401 and a configuration of a classification dictionary database 1402 differ from those described in the fifth embodiment.

The classification dictionary database 1402 is a database that stores characteristic keywords included in each classification; for example, as shown in FIG. 34, for every "classification" there is registered: a "constant characteristic keyword," which is keyword set beforehand; a "topical characteristic keyword," on which registration and deletion are carried out under a predetermined condition; and a "period" which is information of a time period when the topical characteristic keyword is used on the Internet, in an eNewspaper, and the like.

The classification dictionary updating unit 1401 associates the time period information with the topical characteristic keyword and registers that keyword, when registering a topical characteristic keyword in the classification dictionary database 1106 using keywords acquired from the classification keyword extraction unit 1102.

The EPG accumulation unit 1403 accumulates past EPG information acquired by the EPG receiving unit 1107.

Next, an operation of the EPG TV program search system configured as above is described. Note that processes of the present embodiment are identical to those described in the fifth embodiment, and therefore descriptions of identical parts are omitted.

When using the classification dictionary database 1402 as shown in FIG. 34, for example, in November of 2003, a large amount of information about a movie "Metrix" circulated, and therefore the keyword "Metrix" is included in TV programs broadcast during that time period; thus, the classification unit 1108 judges that the information is related to "movies." On the other hand, in the case of October of 2003, where the keyword "Exterminator," rather than the keyword "Metrix," is included, it is judged that the information is related to "movies."

In addition, in the case of searching/classifying TV program information of EPG data received and accumulated in the EPG accumulation unit 1403 in the past, the classification unit 1108 performs the searching/classifying using the topical characteristic keyword corresponding to the time period when the TV program information has been received, from among the topical characteristic keywords registered in the classification dictionary database 1402.

As described above, the topical characteristic keyword is registered in the classification dictionary database 1402 after being associated with information of the time period; for example, by using the time period when a program is televised and the keywords used in that time period, it is possible to perform highly-accurate classification, as compared to the conventional classification of TV programs, and possible to realize classification in accordance with the time period (era).

Note that in the present embodiment, by accumulating past EPG information acquired by the EPG receiving unit 1105, the topical characteristic keyword is associated with the time period information and registered in the classification dictionary database 1402. Furthermore, it is acceptable to use information of a delivery date of an eNewspaper and associate the topical characteristic keyword with that date information. In addition, in the case of using text information from the Internet, by using information of an update time of files of the various contents on the Internet, date and time information written within HTML, and so on, it is possible to associate the topical characteristic keyword with the date information. In particular, Internet content is suited for acquisition of topical characteristic keywords which were prevalent in the past because there are web sites that continue to exist without being updated, as opposed to broadcast content and information from an eNewspaper.

Also, regarding text information from the Internet, web sites may be deleted, and content details of URLs may be updated. Accordingly, in the case where a web site, from which a certain keyword is extracted, was publicized in the past but has now been deleted, that topical characteristic keyword may be deleted from the classification dictionary database. In addition, in the case where a number of the deleted web sites exceeds a predetermined threshold value, that topical characteristic keyword may be deleted from the classification dictionary database.

Moreover, as described in present embodiment, by registering the topical characteristic keyword along with the time period information, as shown in FIG. 34, it is possible to search movie information by, for example, using a search enquiry such as "popular movies in November 2003." Through this, it is possible to classify the movie information based on the era. Although it is possible to perform classification based on the time period using premier information of movies, with the present embodiment, it is possible to perform filtering only on generally popular movies. Note that when searching, keywords are classified as constant characteristic keywords and topical characteristic keywords and are accumulated; therefore, it is possible to perform a content search that more accurately reflects the time period by searching with a weight assigned to the topical characteristic keywords.

In addition, a method in which the topical characteristic keyword is extracted along with the time period information has been described in the present embodiment. Furthermore, by using an extracted keyword dictionary, when the user chooses certain movie information, it is possible to estimate the time period in which that movie was popular from the topical characteristic keywords, and thus it is possible to search movies which were popular during the same period.

Figure 35:
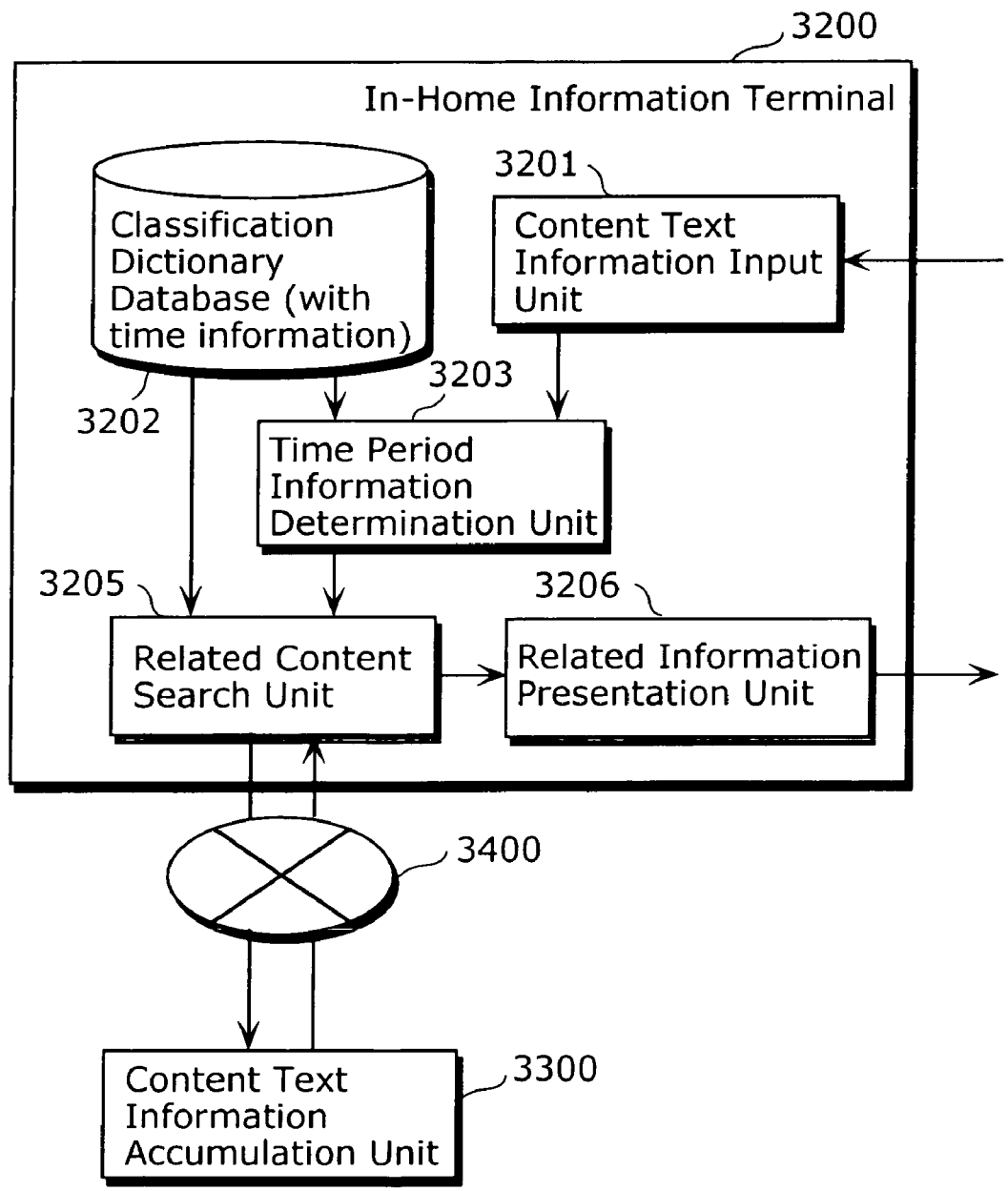
FIG. 35 is a diagram showing a configuration of a search system in a variation of the eighth embodiment of the present invention.

FIG. 35 is a diagram showing a configuration of a search system in such a case. As shown in FIG. 35, in this search system, an in-home information terminal 3200, such as, for example, a digital television, which includes a content text information input unit 3201, a classification dictionary database 3202, a time period information determination unit 3203, a related content search unit 3205, and a related information presentation unit 3206, is connected to a content text information accumulation unit 3300 via a network 3400, such as the Internet.

To be more specific, when explanatory information for a certain movie is inputted into the content text information input unit 3201, the time period information determination unit 3203 compares this information with topical characteristic keywords that are accumulated in the classification dictionary database 3202, as shown in, for example, FIG. 34, and calculates which keywords, from which time period, are included most. As a result, when, for example, November 2003 is selected, the related content search unit 3205 uses the topical characteristic keywords of that time period, and furthermore searches other movie information accumulated in the content text information accumulation unit 3400 on an external network such as the Internet. Then, a result of the search is presented to the user by the related information presentation unit 3206. Through this, it is possible to search movies popular during the same time period by using the classification dictionary database which has had the time period information added. The same principle can be applied to music information, general information regarding news, and so on.

In addition, a method of combining classification dictionaries has been described in the seventh embodiment. Furthermore, as described in the present embodiment, by combining the topical characteristic keywords from a predetermined time period using the time period information of the topical characteristic keywords, it becomes possible to extract a wide range of topical characteristic keywords that are prevalent in the predetermined time period. Through this, there are cases where creation of levels of classifications differs depending on the time period. In this manner, it is also possible to update the creation of levels of classifications in accordance with the time period, rather than simply updating the details of the topical characteristic keywords in the classification dictionary. In addition, in the seventh embodiment, combining and editing using a number of factors between assemblages of the registered keywords are performed, but combining and editing may also be performed using information of a frequency at which the registered keyword is used within a predetermined time period. Through this, it is possible to construct a combined dictionary which reflects the topical characteristic keywords, rather than only reflecting the classifications made according to pre-classified text information.

In addition, in the present embodiment, classification/filtering is performed per TV program using text information of the EPG provided to the TV program. Furthermore, the present classification method can be applied even in the case where meta information is provided to the TV program, and text information is provided in each corner of the TV program, per frame of the video, and the like.

Note that in the present embodiment, the constant characteristic keyword and the topical characteristic keyword are classified and accumulated, but it is also acceptable to define the classification with only the topical characteristic keyword.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

As described above, a dictionary creation device according to the present invention is applicable in appropriate creation and updating of a dictionary used for searching, classifying, and filtering text information, in accordance with a trend of appearance of keywords that make up a text information group. In addition, the dictionary creation device according to the present invention can be applied in, for example, an EPG TV program search system and an Internet search system.

What is claimed is:

1. A dictionary creation device that creates a dictionary used for searching, classifying, or filtering information written as text, said device comprising:
   a keyword extraction unit configured to extract a keyword from a text information group made up of one or more pieces of text information;
   a keyword statistics unit configured to find statistics regarding an appearance of the keyword within the text information group;
   a keyword assessment value calculation unit configured to calculate, using a processor, an assessment value for the keyword based on the statistics;
   a keyword storage unit configured to store a pair made up of the keyword and the assessment value of that keyword, said keyword storage unit being a memory unit;
   a determination unit configured to determine whether or not to register the keyword in the dictionary, or whether or not to delete the keyword from the dictionary, based on a degree of change between the assessment value newly calculated by said keyword assessment value calculation unit and the assessment value stored in said keyword storage unit; and a dictionary registration and deletion unit configured to register or delete the keyword in the dictionary based on a result of the determination, wherein the assessment value calculated by said keyword assessment value calculation unit is an appearance frequency at which the keyword appears in the text information group, wherein said determination unit is configured to determine to delete the keyword from the dictionary in the case where the keyword is already registered in the dictionary and a degree of change in the appearance frequency is greater than or equal to a predetermined threshold value, the degree of change in the appearance frequency indicating a difference between the appearance frequency and a previously calculated appearance frequency, and wherein the same keyword is used for calculating the appearance frequency and the previously calculated appearance frequency.

2. The dictionary creation device according to claim 1, further comprising a second keyword extraction unit configured to extract a keyword from a second text information group made up of one or more pieces of text information, wherein said keyword statistics unit is further configured to find statistics regarding an appearance of the keyword within the second text information group, and said keyword assessment value calculation unit is configured to calculate the assessment values of the keywords extracted by said keyword extraction unit and said second keyword extraction unit based on the respective statistics.

3. The dictionary creation device according to claim 1, wherein the assessment value calculated by said keyword assessment value calculation unit is an inverse document frequency (idf) value of the keyword based on a total number of pieces of text information in the text information group and a number of pieces of text information that include the keyword, and said determination unit is configured to determine to register the keyword in the dictionary in the case where the keyword is not yet registered in the dictionary and a degree of change in the idf value is greater than or equal to a predetermined threshold value.

4. The dictionary creation device according to claim 3, wherein said determination unit is configured to determine to delete the keyword from the dictionary in the case where the keyword is already registered in the dictionary and a degree of change in the idf value is less than a predetermined threshold value.

5. The dictionary creation device according to claim 1, wherein the assessment value calculated by said keyword assessment value calculation unit is an inverse document frequency (idf) value of the keyword based on a total number of pieces of text information in the text information group and a number of pieces of text information that include the keyword;

the dictionary is an unnecessary word dictionary; and said determination unit is configured to determine to register the keyword in the unnecessary word dictionary in the case where the keyword is not yet registered in the unnecessary word dictionary and a degree of change in the idf value is less than a predetermined threshold value.

6. The dictionary creation device according to claim 5, wherein said determination unit is configured to determine to delete the keyword from the unnecessary word dictionary in the case where the keyword is already registered in the unnecessary word dictionary and a degree of change in the idf value is greater than or equal to a predetermined threshold value.

7. The dictionary creation device according to claim 1, wherein said determination unit is configured to determine to register the keyword in the dictionary in the case where the keyword is not yet registered in the dictionary and a degree of change in the appearance frequency is less than a predetermined threshold value.

8. The dictionary creation device according to claim 1, wherein the dictionary is an unnecessary word dictionary; and said determination unit is configured to determine to register the keyword in the unnecessary word dictionary in the case where the keyword is not yet registered in the unnecessary word dictionary and a degree of change in the appearance frequency is greater than or equal to a predetermined threshold value.

9. The dictionary creation device according to claim 8, wherein said determination unit is configured to determine to delete the keyword from the unnecessary word dictionary in the case where the keyword is already registered in the unnecessary word dictionary and a degree of change in the appearance frequency is less than a predetermined threshold value.

10. The dictionary creation device according to claim 1, wherein the text information is Electric Program Guide (EPG) data;

the dictionary is created based on a type of broadcast wave;

said keyword extraction unit is configured to extract a keyword from the text information group based on the type of the broadcast wave; and said dictionary registration and deletion unit is configured to register or delete the keyword in the dictionary based on the type of the broadcast wave.

11. The dictionary creation device according to claim 1, wherein the text information is Electric Program Guide (EPG) data;

the dictionary is created based on a time period of a broadcast;

said keyword extraction unit is configured to extract a keyword from the text information group based on the time period of the broadcast; and said dictionary registration and deletion unit is configured to register or delete the keyword in the dictionary based on the time period of the broadcast.

12. A dictionary creation method for creating a dictionary used for searching, classifying, or filtering information written as text, said method comprising:

extracting a keyword from a text information group made up of one or more pieces of text information;

finding statistics regarding an appearance of the keyword within the text information group;

calculating, using a processor, an assessment value for the keyword based on the statistics;

storing, in a keyword storage unit, a pair made up of the keyword and the assessment value of that keyword, said keyword storage unit being a memory unit;

determining whether or not to register the keyword in the dictionary, or whether or not to delete the keyword from the dictionary, based on a degree of change between the assessment value newly calculated in said calculating and the assessment value stored in said keyword storage unit; and registering or deleting the keyword in the dictionary based on a result of the determination, wherein the assessment value calculated in said calculating is an appearance frequency at which the keyword appears in the text information group, wherein said determining comprises determining to delete the keyword from the dictionary in the case where the keyword is already registered in the dictionary and a degree of change in the appearance frequency is greater than or equal to a predetermined threshold value, the degree of change in the appearance frequency indicating a difference between the appearance frequency and a previously calculated appearance frequency, and wherein the same keyword is used for calculating the appearance frequency and the previously calculated appearance frequency.

13. A program embodied on a non-transitory computer-readable storage medium for creating a dictionary used for searching, classifying, or filtering information written as text, said program causing a computer to execute the steps of:

extracting a keyword from a text information group made up of one or more pieces of text information;

finding statistics regarding an appearance of the keyword within the text information group;

calculating, using a processor, an assessment value for the keyword based on the statistics;

storing, in a keyword storage unit, a pair made up of the keyword and the assessment value of that keyword, said keyword storage unit being a memory unit;

determining whether or not to register the keyword in the dictionary, or whether or not to delete the keyword from the dictionary, based on a degree of change between the assessment value newly calculated in said calculating and the assessment value stored in said keyword storage unit; and registering or deleting the keyword in the dictionary based on a result of the determination, wherein the assessment value calculated in said calculating is an appearance frequency at which the keyword appears in the text information group, wherein said determining comprises determining to delete the keyword from the dictionary in the case where the keyword is already registered in the dictionary and a degree of change in the appearance frequency is greater than or equal to a predetermined threshold value, the degree of change in the appearance frequency indicating a difference between the appearance frequency and a previously calculated appearance frequency, and wherein the same keyword is used for calculating the appearance frequency and the previously calculated appearance frequency.

* * * * *